US012697892B2

(12) United States Patent
Facanha De Oliveira

(10) Patent No.: US 12,697,892 B2
(45) Date of Patent: Aug. 4, 2026

(54) ON-BOARD CHARGER FOR VEHICLE BATTERY AND METHOD OF CHARGING AND USING VEHICLE BATTERY

(71) Applicant: HUAWEI TECHNOLOGIES CO., LTD., Shenzhen (CN)

(72) Inventor: Eduardo Facanha De Oliveira, Nuremberg (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 727 days.

(21) Appl. No.: 18/179,342

(22) Filed: Mar. 6, 2023

(65) Prior Publication Data

US 2023/0202320 A1     Jun. 29, 2023

Related U.S. Application Data

(63) Continuation of application No. PCT/EP2020/075076, filed on Sep. 8, 2020.

(51) Int. Cl.
H01M 10/44          (2006.01)
B60L 50/51          (2019.01)
(Continued)

(52) U.S. Cl.
CPC ............... B60L 53/24 (2019.02); B60L 50/51 (2019.02); H02J 7/02 (2013.01); H02M 1/4225 (2013.01);
(Continued)

(58) Field of Classification Search
CPC .... H02J 7/02; H02J 2310/48; H02M 3/33584; H02M 1/15; H02M 3/01; H02M 3/1582;
(Continued)

(56) References Cited

U.S. PATENT DOCUMENTS 7,932,633 B2 *    4/2011   King ...................... B60L 53/14
                                                                    307/45
10,562,404 B1     2/2020   Khaligh et al.
                  (Continued)

FOREIGN PATENT DOCUMENTS

CN          103730940 A      4/2014
FR           2937803 A3      4/2010
                  (Continued)

OTHER PUBLICATIONS

Nadim Sakr et al., A new combined bidirectional boost converter and battery charger for electric vehicles, IECON2015-Yokohama Nov. 9-12, 2015, 6 pages.
(Continued)

*Primary Examiner* — Edward Tso

(57)     ABSTRACT

An electric vehicle that includes an on-board charger for a battery of an electric vehicle. The electric vehicle includes an AC machine and an inverter drive for the AC machine. The on-board charger includes an integrated active filter rectifier coupled to a DC/DC converter. The integrated active filter rectifier is configured to use at least one phase inductor of the AC machine and at least one leg of the inverter drive to perform power factor correction. The on-board charger is a non-isolated converter that renders both operations of traction and charging from both single-phase and three-phase grids. Moreover, the on-board charger performs fast AC charging without generating shaft torque during charging.

18 Claims, 20 Drawing Sheets

(51) Int. Cl.

| | |
|---|---|
| *B60L 53/24* | (2019.01) |
| *H01M 10/46* | (2006.01) |
| *H02J 7/02* | (2016.01) |
| *H02M 1/42* | (2007.01) |
| *H02M 3/156* | (2006.01) |
| *H02M 3/335* | (2006.01) |
| *H02J 105/37* | (2026.01) |

(52) U.S. Cl.
CPC ....... *H02M 3/156* (2013.01); *H02M 3/33584* (2013.01); *B60L 2210/10* (2013.01); *B60L 2210/40* (2013.01); *H02J 2105/37* (2026.01)

(58) Field of Classification Search
CPC ...... B60L 2210/10; B60L 50/51; B60L 53/24; Y02T 10/92; Y02T 90/14
USPC ........................................ 320/104, 107, 140
See application file for complete search history.

(56) References Cited

U.S. PATENT DOCUMENTS

| | | | |
|---|---|---|---|
| 2011/0254494 A1 | 10/2011 | Briane et al. | |
| 2012/0286740 A1 | 11/2012 | Loudot et al. | |
| 2017/0057368 A1 | 3/2017 | King et al. | |
| 2019/0184833 A1 | 6/2019 | Elshaer et al. | |

FOREIGN PATENT DOCUMENTS

| | | |
|---|---|---|
| WO | 2015192133 A2 | 12/2015 |
| WO | 2019199964 A1 | 10/2019 |

OTHER PUBLICATIONS

Ivan Subotic et al., An EV Drive-Train With Integrated Fast Charging Capability, IEEE Transactions On Power Electronics, vol. 31, No. 2, Feb. 2016, 11 pages.

"Automotive Standards: LV123," [Online]. Available: https://www.atecorp.com/compliance-standards/lv/lv-123. [Accessed Aug. 1, 2020], 1 pages.

Continental AG, CES 2018: Continental automates charging of electric vehicles and makes them a mobile power bank, Dec. 13, 2017, 4 pages.

Thiago B. Soeiro et al., Hybrid Active Third-Harmonic Current Injection Mains Interface Concept for DC Distribution Systems, IEEE Transactions On Power Electronics, vol. 28, No. 1, Jan. 2013, 7 pages.

Jantsch, M, and Verhoeve, C W.G. Inverters with three phase output and without electrolyte capacitor for improved lifetime, efficiency and costs of grid connected systems. Netherlands: N. p., 1997. Web, with the English Abstract, 3 pages.

* cited by examiner

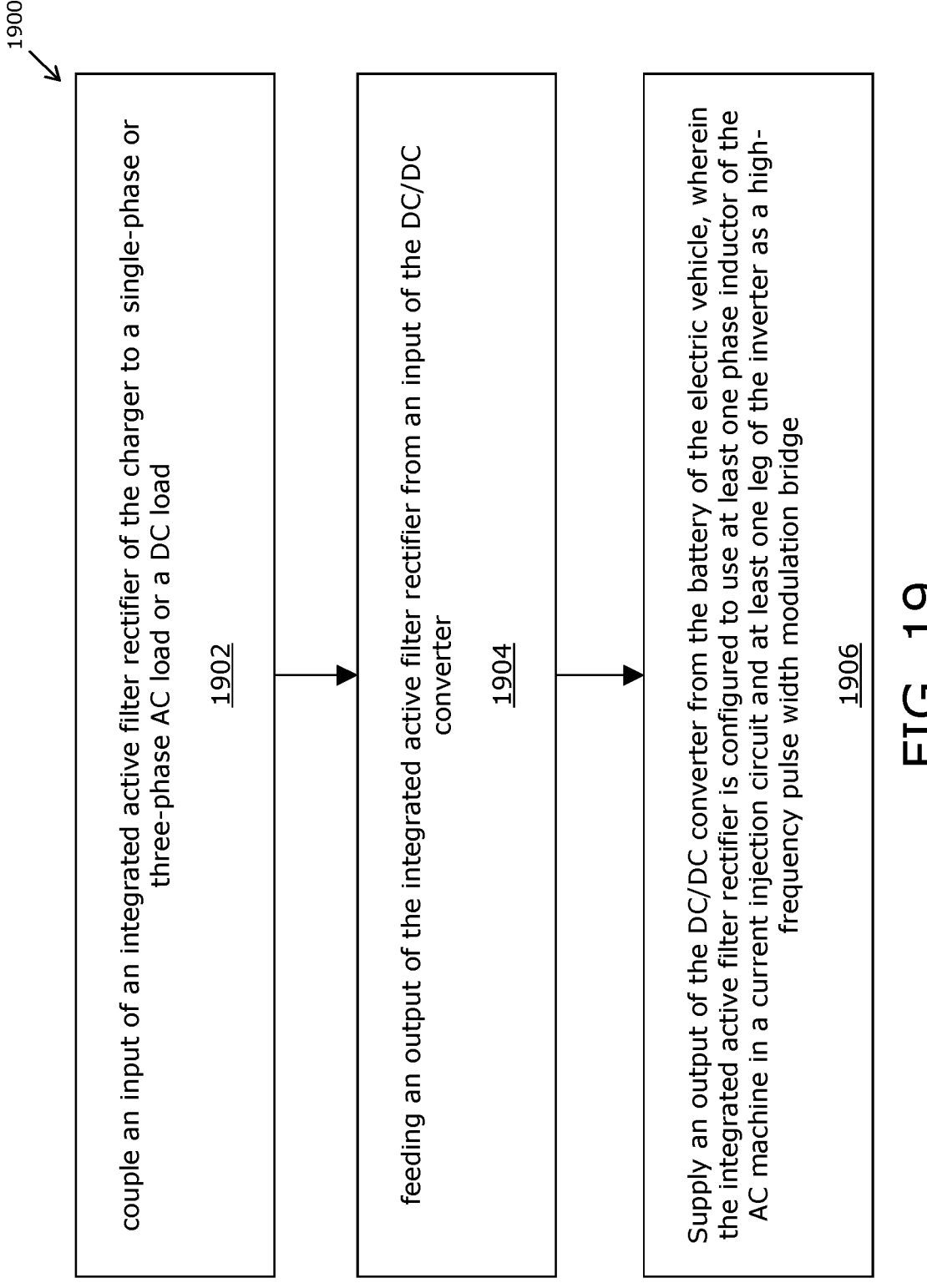

1900 couple an input of an integrated active filter rectifier of the charger to a single-phase or three-phase AC load or a DC load

1902 feeding an output of the integrated active filter rectifier from an input of the DC/DC converter

1904

Supply an output of the DC/DC converter from the battery of the electric vehicle, wherein the integrated active filter rectifier is configured to use at least one phase inductor of the AC machine in a current injection circuit and at least one leg of the inverter as a high-frequency pulse width modulation bridge

ON-BOARD CHARGER FOR VEHICLE BATTERY AND METHOD OF CHARGING AND USING VEHICLE BATTERY

CROSS-REFERENCE TO RELATED APPLICATIONS

This application is a continuation of International Application No. PCT/JP2020/075076, filed on Sep. 8, 2020, the disclosure of which is hereby incorporated by reference in its entirety.

TECHNICAL FIELD

The disclosure relates generally to on-board chargers for batteries of electric vehicles, and in particular to integrated on-board chargers. Moreover, the disclosure also relates to methods of charging a battery of an electric vehicle, and using a vehicle battery for powering external loads.

BACKGROUND

Production and the use of battery-powered electric vehicle (such as electric cars, electric motorcycles, electric planes, and electric ships) has increased recently as technology has developed. Compared to vehicles powered by internal combustion engines (such as gas and diesel powered cars), battery powered electric vehicles suffer from the disadvantage that "refuelling" requires access to specialised charging stations that are not only sparsely distributed but also considerably slower to completely "refuel" the vehicle. Among the constraints limiting the extensive deployment of charging stations is the fact that different vehicles have different charging requirements in terms of charging rate, type of power supply (direct current (DC) or alternating current (AC)), at a specified voltage. Ultimately, a vehicle battery needs to be connected to a source of direct current in order to be charged. DC charging stations can provide such a source of direct current, but such DC charging stations tend to be expensive to install. In order to use an AC charging station, a battery powered electric vehicle requires on-board circuitry or systems to convert alternating current from the charging station into direct current to charge the vehicle's battery. Such circuitry or systems are often referenced as an on-board charger.

Although the provision of an on-board charger enables a vehicle to charge it's battery from an AC charging station, the cost of the on-board charger necessarily increases the build cost of the vehicle, and also the on-board charger adds weight and takes up space inside the vehicle. The desire to enable quick "refuelling" means that there is pressure to provide enhanced on-board chargers although these tend to be both bulkier and more expensive than chargers only capable of a relatively slow rate of charge. For example, the increased cost of such chargers may come from the need to provide components capable of handling larger currents, and/or from the need to increase component count.

Integrated on-board chargers, which utilise for charging purposes some components that are also used in traction mode, have been developed to meet the demand for high charging rates and/or to save weight, volume and cost from the usual on-board chargers. However, such integrated on-board chargers tend to require additional costly high frequency semiconductors for charging. Furthermore, since they are commonly non-isolated circuits, the Common-Mode Voltage (CMV) generated across the poles of the battery of the electric vehicle plays an important role in the design of such chargers. For instance, the presence of high-frequency CMV leads to the need for extensive Electromagnetic Interference (EMI) filtering due to the generated leakage current through the parasitic capacitance between the battery poles and the vehicle chassis, which in turn is grounded during charging events. In addition, some integrated on-board chargers generate shaft torque on the AC machine (the EV Motor) during charging, meaning that a heavy duty electric parking brake may be required. Thus, there exists the problem of how to provide a cost-effective on-board charger which has high charging rates while avoiding some or all of the aforementioned disadvantages.

Therefore, in light of the foregoing discussion, there exists a need to overcome one or more of the aforementioned drawbacks associated with known integrated on-board chargers.

SUMMARY

An object of the disclosure is to provide a solution that overcomes at least partially the problems encountered in prior art integrated on-board chargers.

The object of the disclosure is achieved by the solutions provided in the enclosed independent claims. Advantageous implementations of the disclosure are further defined in the dependent claims.

In a first aspect, the disclosure provides an on-board charger for a battery of an electric vehicle, wherein the electric vehicle includes an AC machine and an inverter drive for the AC machine, the on-board charger comprising: an integrated active filter rectifier coupled to a DC/DC converter; wherein the integrated active filter rectifier is configured to use at least one phase inductor of the AC machine and at least one leg of the inverter drive to perform power factor correction.

In an example, the integrated active filter rectifier is coupled to a DC/DC converter for charging the battery and further the inverter drive enables a charged battery to provide traction current to the AC machine. The inverter drive is used for Pulse Width Modulation (PWM) during traction as well as during charging of the battery. The at least one phase inductor of the AC machine, which is used during traction, also enables the injection of a third harmonic current back into the three-phase mains supply during charging of the battery. Thus, whereas conventional on-board chargers require distinct and different circuitry respectively to perform charging and traction, the on-board charger according to the disclosure uses some circuit elements for both charging and traction. Moreover, the on-board charger of the disclosure enables the vehicle battery to be charged without generating shaft torque. Further, in comparison to some integrated on-board charger solutions found in the literature, the on-board charger of the disclosure needs neither a specially designed AC machine nor external devices to reconfigure the motor windings to enable rapid charging of the battery. Moreover, the on-board charger of the disclosure can be implemented without the use of additional costly high frequency semiconductors, the existing inverter drive realizes a main Pulse Width Modulation (PWM) function. In addition, only low frequency Common-Mode Voltage (CMV) is present across the battery poles, thereby reducing the Electromagnetic Interference (EMI) filter burden.

In a first possible implementation of the first aspect, the integrated active filter rectifier includes at least one pair of diodes for each phase of a three-phase mains power supply.

By using pairs of diodes for rectification of an AC input, the cost of the rectification stage of the integrated active filter rectifier can be reduced.

In a second possible implementation of the first aspect, the integrated active filter rectifier includes an active power switch in parallel with each of the diodes. In this way, bidirectional power flow through integrated active filter rectifier can be achieved. The on-board charger accordingly can be used in charging the battery of the vehicle, but also provides a current path by means of which power from the battery of the vehicle can be supplied for consumption off the vehicle.

In a third possible implementation of the first aspect, each active power switch comprises a MOSFET device, and the diodes are provided by intrinsic body diodes of the MOS-FET devices.

The skilled person will understand that a MOSFET device includes an intrinsic body diode, and this intrinsic diode can be used to provide rectification in the integrated active filter rectifier without the need of a discrete diode in addition to the MOSFET device.

In a fourth possible implementation of the first aspect, the DC/DC converter is a bidirectional device. In this way, the DC/DC converter can remain in circuit when the battery of the vehicle is used to supply power for consumption off the vehicle, as well as during charging of the battery.

In a fifth possible implementation of the first aspect, the integrated active filter rectifier includes a pair of active power switches for each phase of a three-phase mains power supply, and each of the pairs of active power switches are coupled together at a common point, the common point being coupled to a neutral terminal of the AC machine.

By virtue of coupling the common point of each of the pairs of active power switches to the neutral terminal of the AC machine, conduction losses are decreased as an equivalent resistance of phase inductors of the AC machine is decreased.

In a sixth possible implementation of the first aspect, the integrated active filter rectifier includes a pair of active power switches for each phase of a three-phase mains power supply, and each of the pairs of active power switches are coupled together at a common point, the common point being coupled to one of the phases of the AC machine.

By virtue of coupling the common point of each of the pairs of active power switches to one of the phases of the AC machine, access to a neutral terminal of the AC machine is not required.

In a seventh possible implementation according to the first aspect as such or according to any of the first through sixth implementation forms of the first aspect, the on-board charger further comprises a first capacitor connected across an input of the DC/DC converter, wherein the first capacitor is configured to support commutation of switches of the inverter drive. In this way, a necessary current path can be maintained for the imposed injection current provided by the phase inductor of the AC machine, thereby helping to maintain power factor correction.

In an eighth possible implementation of the seventh possible implementation of the first aspect, the on-board charger is so configured that a second capacitor having a greater capacitance than the first capacitor is connected in parallel with the first capacitor while the AC machine is in propulsion mode.

The second capacitor is a large (typically many hundreds or thousands of microfarads, and always many times the capacitance of the first capacitor) inverter DC-link which, for example, serves as a low-inductance power source in propulsion mode (effectively supplementing the vehicle battery but with lower inductance) particularly during acceleration, as well as serving to protect the battery from current surges during braking events, etc. It will be appreciated that the second capacitor is only connected in parallel with the first capacitor in propulsion mode.

In a ninth possible implementation according to the first aspect as such or according to any of the first through eighth implementation forms of the first aspect, the DC/DC converter is configurable to provide an internal path for current to flow from an output stage of the DC/DC converter to the AC machine in propulsion mode.

By virtue of the internal path for current the DC/DC converter can be bypassed internally. In this way, a DC current flows through only some DC/DC components in propulsion mode.

In a tenth possible implementation according to the first aspect as such or according to any of the first through ninth implementation forms of the first aspect, a switching device is provided to enable the DC/DC converter to be bypassed while the AC machine is propelling the electric vehicle but not when the charger is providing charging current to the battery of the electric vehicle.

By virtue of using the switching device, which is an external switching device, the DC/DC converter is used only during charging of the battery, and not in propulsion mode.

In a eleventh possible implementation according to the first aspect as such or according to any of the first through sixth implementation forms of the first aspect, a capacitor is coupled across the output of the DC/DC converter, and the DC/DC converter is configured to supply energy from the capacitor to the output of the first stage of the on-board charger during charging.

In a twelfth possible implementation according to the first aspect as such, the on-board charger is configured to support charging from a single-phase AC power supply by using elements of the integrated active filter rectifier as a bridge-less totem-pole power factor correction rectifier. In this way, without the need for additional rectification components, it becomes possible to use the on-board charger of the disclosure to charge the battery of the vehicle from a single-phase AC power supply, as well as from a three-phase AC power supply.

In a thirteenth possible implementation of the twelfth possible implementation of the first aspect, the on-board charger includes a control arrangement to modulate at least one leg of the bridge at high frequency to generate a sinusoidal current through a corresponding phase inductor of the AC machine.

An interleaved operation of the three legs (i.e. modulation of multiple legs of the bridge) is beneficial as conduction losses are lower and ripples are reduced.

In a fourteenth possible implementation form according to the first aspect as such, the on-board charger is configured to support charging from a DC power supply by using elements of the integrated active filter rectifier as a DC/DC converter.

By virtue of using elements of the integrated active filter rectifier as the DC/DC converter, the on-board charger enables charging from a DC power source when needed as well as with charging from an AC power source when possible.

In a fifteenth possible implementation of the fourteenth possible implementation of the first aspect, the on-board charger including a control arrangement to modulate at least one leg of the bridge at high frequency to control a direct current through a corresponding phase inductor of the AC machine.

By virtue of the control arrangement the at least one leg of the three-phase bridge is modulated at high frequency to control the DC current through the corresponding phase inductor of the AC machine. Beneficially, an interleaved operation of the three legs enables reduction of conduction losses and reduction of current ripple.

In a sixteenth possible implementation according to the first aspect as such or according to any of the first through fifteenth implementation forms of the first aspect, the integrated active filter rectifier comprises a third harmonic current injection circuit.

The third harmonic current injection circuit serves as an active harmonic filter for achieving a high power factor.

In a seventeenth possible implementation according to the first aspect as such or according to any of the first through sixteenth implementation forms of the first aspect, the DC/DC converter is configured to support charging of nominally 400 volt batteries and to support charging of nominally 800 volt batteries.

Beneficially, the on-board charger of the disclosure provides the DC/DC converter unit that can be chosen according to system requirements, such as for charging 400 volt batteries or 800 volt batteries.

In a eighteenth possible implementation according to the first aspect as such or according to any of the first through sixteenth implementation forms of the first aspect, the DC/DC converter includes a non-isolated step-down DC/DC circuit for charging nominally 400 volt batteries.

By virtue of using the step-down DC/DC circuit, 400 volt batteries are charged, for example those whose upper operating limit is 470 volts.

In a nineteenth possible implementation according to the first aspect as such or according to any of the first through sixteenth implementation forms of the first aspect, the DC/DC converter includes a non-isolated step-down/step-up DC/DC circuit for charging either nominally 400 volt batteries or nominally 800 volt batteries.

By virtue of the step-down/step-up DC/DC circuit, a bidirectional step-up/step-down is used to enable the charging of 800 volt batteries, for example those whose operating voltage range goes from to 450 volt to 770 volt.

In a twentieth possible implementation according to the first aspect as such or according to any of the first through sixteenth implementation forms of the first aspect, the DC/DC converter includes an isolated DC/DC circuit for charging either nominally 400 volt batteries or nominally 800 volt batteries.

By virtue of using an isolated DC/DC circuit, a galvanic isolation is provided, making compliance with safety requirements easier and further enabling charging of both nominally 400 volt and nominally 800 volt batteries.

In a twenty-first possible implementation according to the first aspect as such or according to any of the first through twentieth implementation forms of the first aspect, the on-board charger further comprising a connection arrangement to connect the integrated active filter rectifier to a single-phase or three-phase AC power supply or to a DC power supply.

By virtue of the connection arrangement the on-board charger of the disclosure in comparison to conventional on-board chargers supports charging via any of AC power supply or DC power supply and single phase or three-phase AC power supply. Some conventional on-board chargers support charging from only single-phase AC power supply.

In a second aspect, the disclosure provides an on-board charger module for integration into a battery-powered electric vehicle that has an AC machine propulsion unit, the module including: an input for connection to an alternating current power supply for use in charging a battery of the electric vehicle, an output for connection to the battery of the vehicle, the input being coupled to an integrated active filter rectifier coupled to a DC/DC converter that has an output that is coupled to the output of the module; the module further comprising an inverter drive for the AC machine of the vehicle, wherein the integrated active filter rectifier is configured to use at least one phase inductor of the AC machine and at least one leg of the inverter drive to perform power factor correction.

By virtue of providing the main components of an on-board charger according to the disclosure, other than the AC machine, as a single module, assembly of battery-powered vehicles including the on-board charger is simplified and economies of scale can be achieved.

In a first possible implementation of the second aspect, the module further comprising a first electromagnetic interference filter coupled between the output of the DC filter and the output of the module, and a second electromagnetic interference filter coupled between the input of the module and the integrated active filter rectifier. Including these EMI filters in the module further simplifies assembly of battery powered vehicles that include the new on-board charger according to the disclosure.

In a third aspect, the disclosure provides an electric vehicle including an on-board charger according to the first aspect as such or according to any of the first through twenty-first implementation forms of the first aspect.

The disclosure provides an electric vehicle with an improved on-board charging arrangement whose components are for the operations of both traction and charging. An inverter drive of the on-board charger is used for Pulse Width Modulation (PWM) during traction as well as during charging of a battery of the on-board charger. At least one phase inductor of an AC machine of the vehicle, which is used during traction, is also used to inject back a third harmonic current into mains phases during charging of the vehicle battery from a three-phase mains supply.

Moreover, the electric vehicle benefits from having an on-board charger that enables a fast charging rate of the battery without generating motor shaft torque. Further, in comparison to conventional electric vehicles, the on-board charger of the electric vehicle needs neither a specially designed AC machine nor external devices to reconfigure the motor windings to enable fast charging rate of the battery.

In a fourth aspect, the disclosure provides a method of charging a battery of an electric vehicle that includes an AC machine, an inverter drive for the AC machine, and an on-board charger, the method comprising: coupling an input of an integrated active filter rectifier to a single-phase or three-phase AC power supply network or a DC power supply network; feeding a DC/DC converter with an output of the integrated active filter rectifier; supplying an output of the DC/DC converter to a battery of the electric vehicle; wherein the integrated active filter rectifier is configured to use at least one phase inductor of the AC machine and at least one leg of the inverter drive to perform power factor correction.

The method of the disclosure enables fast charging rate of the battery, without generating shaft torque.

In a fifth aspect, the disclosure provides a method of using a battery of an electric vehicle as a power source for powering external loads, the electric vehicle including an AC machine, an inverter drive for the AC machine, and an on-board charger, the on-board charger including: an integrated active filter rectifier coupled to a DC/DC converter;

wherein the integrated active filter rectifier is configured to use at least one phase inductor of the AC machine and at least one leg of the inverter drive to perform power factor correction; the method comprising: coupling an input of the integrated active filter rectifier to a single-phase or three-phase AC load or a DC load; feeding an output of the integrated active filter rectifier from an input of the DC/DC converter; and supplying an output of the DC/DC converter from the battery of the electric vehicle.

The on-board charger of the disclosure enables the battery of an electric vehicle to be used as a power bank, both for loads that require a direct current supply and for loads that require an alternating current supply.

It is to be appreciated that any or all the aforementioned implementation forms can be combined where this is not otherwise precluded.

It will be appreciated that features of the disclosure are susceptible to being combined in various combinations without departing from the scope of the disclosure as defined by the appended claims.

Additional aspects, advantages, features and objects of the disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the disclosure, exemplary constructions of the disclosure are shown in the drawings. However, the disclosure is not limited to specific methods and instrumentalities disclosed herein. Moreover, those in the art will understand that the drawings are not to scale. Wherever possible, like elements have been indicated by identical numbers.

Embodiments of the disclosure will now be described, by way of example only, with reference to the following diagrams wherein:

FIG. 19 is a flow chart of using a battery of an electric vehicle as a power source for powering external loads, in accordance with an example of the disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the disclosure and ways in which they can be implemented. Although some modes of carrying out the disclosure have been disclosed, those skilled in the art will recognize that other embodiments for carrying out or practicing the disclosure are also possible.

Figure 1:
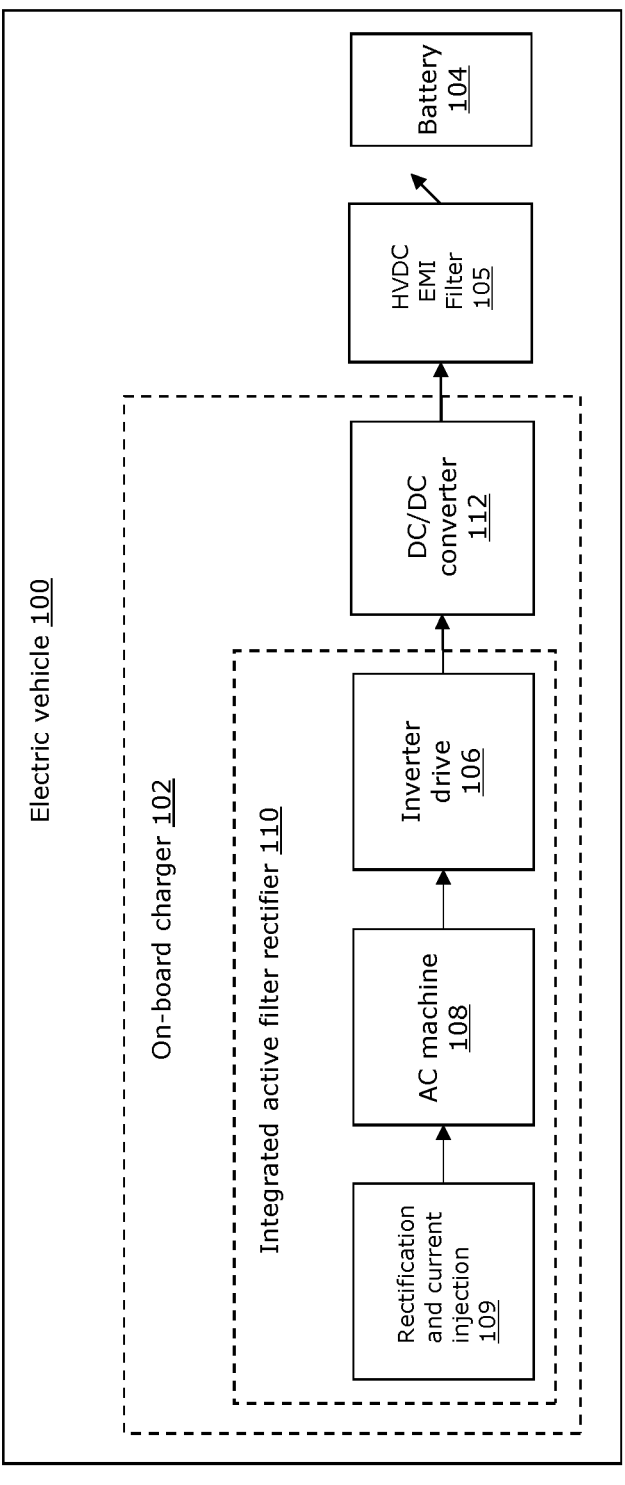
FIG. 1 is an illustration of a block diagram of an electric vehicle, in accordance with an example of the disclosure.

FIG. 1 is a block diagram of a battery-powered electric vehicle 100, in accordance with an embodiment of the disclosure. FIG. 1 mainly illustrates various elements of the electric vehicle 100 associated with two primary functions, i.e. a charging mode and a traction or propulsion mode, of the electric vehicle 100. As shown, the electric vehicle 100 includes an on-board charger 102, a battery 104, an inverter drive 106 and an AC machine 108. The battery 104 interfaces to the rest of the components of the system through a high voltage DC EMI filter 105. The on-board charger 102 and the battery 104 operate together during the charging mode. Whereas the battery 104, the inverter drive 106 and the AC machine 108, operate together in the traction mode. Moreover, as shown, the on-board charger 102 includes an integrated active filter rectifier 110 coupled to a DC/DC converter 112. The integrated active filter rectifier 110 includes rectification and current injection functions 109, and, as will be explained, also makes use of elements of the AC machine 108, and the inverter drive 106.

The on-board charger 102 of the disclosure is an integrated on-board charger. The term "integrated on-board charger" used herein refers to the integrated nature of the on-board charger 102. In other words, the on-board charger 102 is not a separate unit operable only to charge the battery 104, rather the on-board charger 102 is configured to operate in association with other elements, such as the inverter drive 106 and the AC machine 108, of the electric vehicle 100, that are also used for purposes other than charging the vehicle battery. Therefore, in FIG. 1, the integrated nature of the on-board charger 102 is depicted with the help of dotted lines surrounding the on-board charger 102 which is shown as including the inverter drive 106 and the AC machine 108. The on-board charger 102, including the inverter drive 106 and the AC machine 108, is configured to perform power factor correction of an AC supply while charging the battery 104. Specifically, the integrated active filter rectifier 110 of the on-board charger 102 is configured to use at least one phase inductor of the AC machine 108 and at least one leg of the inverter drive 106 to perform power factor correction, which is explained in greater detail herein later.

Figure 2:
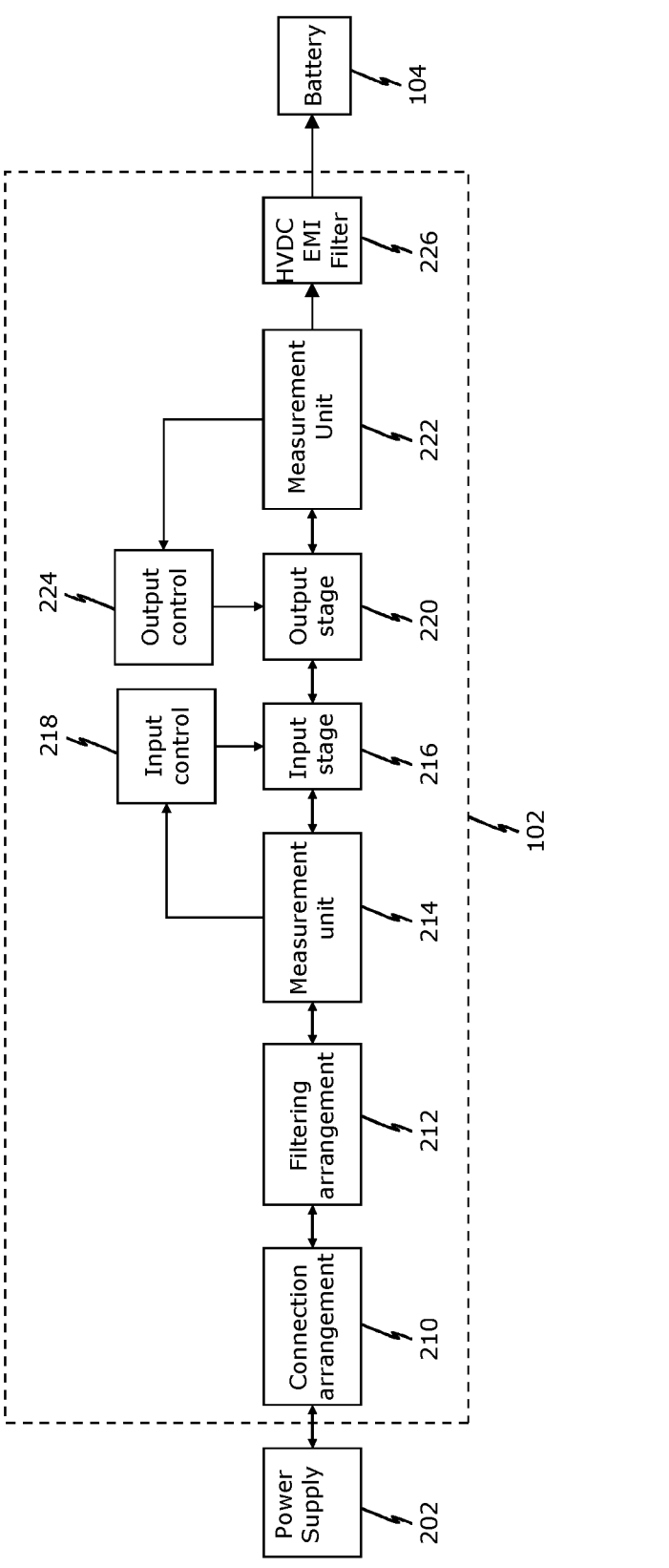
FIG. 2 is an illustration of a block diagram depicting an exemplary implementation of the on-board charger of FIG. 1, in accordance with an example of the disclosure.

Referring now to FIG. 2, illustrated is a block diagram depicting an exemplary implementation of the on-board charger 102 of FIG. 1, in accordance with an embodiment of the disclosure. As shown, the on-board charger 102 can be electrically coupled to a power source 202, such as a power supply network, for drawing electrical power for charging the battery 104. The power supply 202 is advantageously an alternating current three-phase power supply network. Alternatively, as will be explained later, the power supply 202 may be direct current or an alternating current single-phase power supply.

The on-board charger 102 includes a connection arrangement 210 for electrically coupling the on-board charger 102 with the power supply 202. In an example, the connection arrangement 210 may be a charging plug configured to supply electrical power from the power supply 202. For example, the connection arrangement 210 is configured to connect the integrated active filter rectifier 110, shown in FIG. 1, to a single-phase or three-phase AC power supply or to a DC power supply network.

The on-board charger 102 also includes a filtering arrangement 212 comprising an AC electromagnetic interference (EMI) filter, operable to attenuate high frequency electromagnetic noise present on power and signal lines. Specifically, the filtering arrangement 212 is operable to reduce electromagnetic interference produced by various operating components of the on-board charger 102, for example caused by the switching of the semiconductor switches of the on-board charger 102.

The on-board charger 102 further includes a measurement unit 214 operable to measure current through the inductors of the AC machine 108. As shown, the on-board charger 102 also includes an input stage 216 electrically or operatively coupled to the measurement unit 214. The term "input stage" used herein refers to an arrangement of electrical elements or components responsible for regulating current drawn from the power supply network. According to the disclosure, the input stage 216 of the on-board charger 102 is constituted by the integrated active filter rectifier 110, including elements of the inverter drive 106 and of the AC machine 108, shown in the FIG. 1 and will be better shown and explained in conjunction with FIG. 3. This arrangement of the input stage 216 illustrates the integrated nature of the on-board charger 102 of the disclosure.

As shown in FIG. 2, the on-board charger 102 also includes an input control 218 for the regulation of the current to be provided by the input stage 216 while charging the battery 104. The input control 218 operates on measurement data received from the measurement unit 214, and regulate the operation of the various components of the input stage 216, thereby regulating the input current drawn from the external power supply 202. In other words, the input control 218 acts as a regulator of the current through the inductors 108 of the AC machine) of the input stage 216. In an example, the input control 218 may include components, such as a controller programmed in a manner, to provide control signals for controlling operations of the various components of the input stage 216 to provide desired regulation of the current provided to the input stage 216.

The output current from the input stage 216 is received by an output stage 220 of the on-board charger 102. The on-board charger 102 also includes a measurement unit 222 and an output control 224 associated with the output stage 220. According to the disclosure, the output stage 220 includes the DC/DC converter 112, shown in FIG. 1. Moreover, the output control 224 is operable to generate control signals, based on measurement data of the measurement unit 222, for controlling operations of various components of the output stage 220. This allows the output stage 220 to provide a current output required for efficient charging of the battery 104, which is explained in greater detail in conjunction with FIG. 3.

Figure 3:
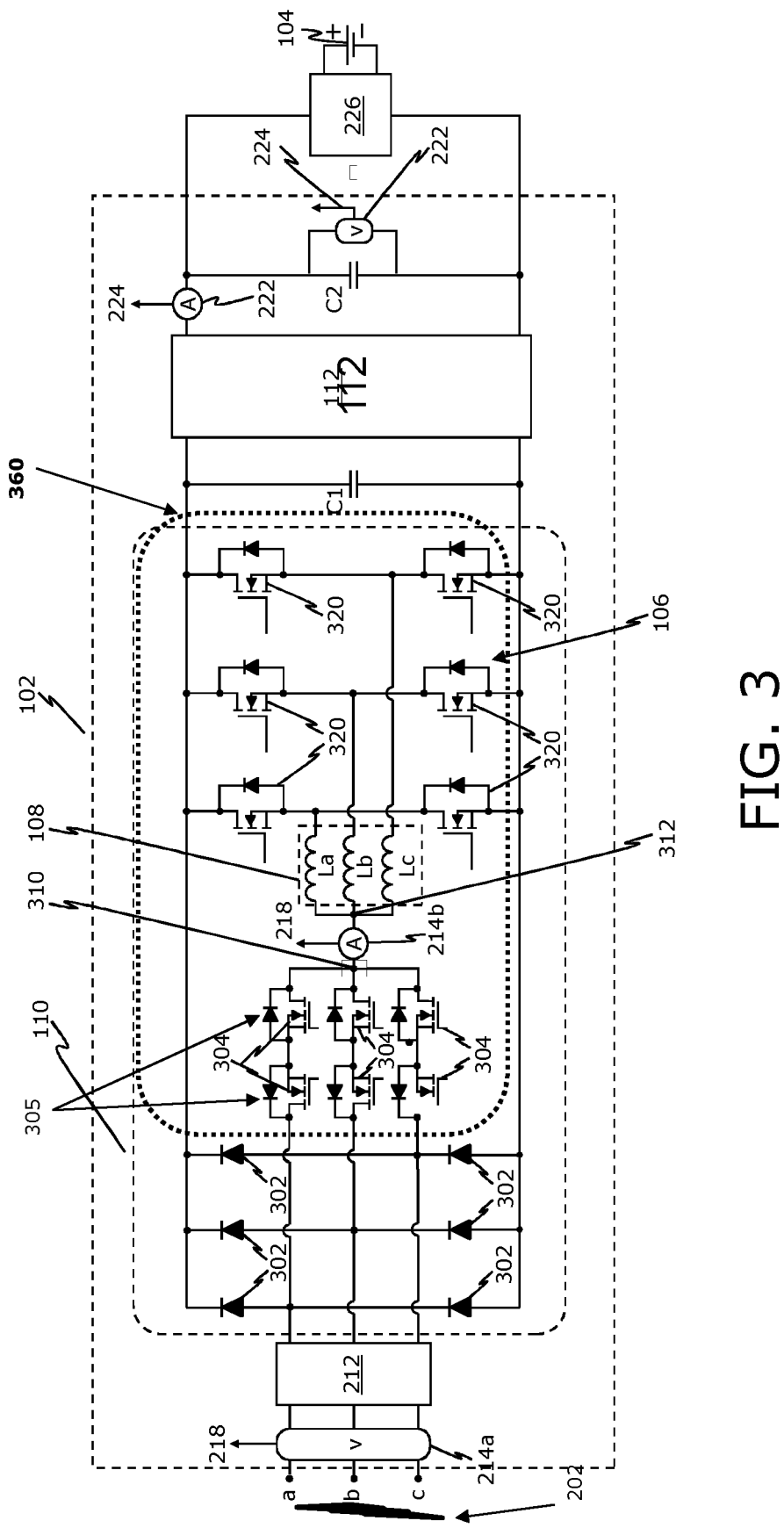
FIG. 3 is an illustration of a circuit diagram corresponding to the on-board charger of FIG. 2, in accordance with an example of the disclosure.

Referring now to FIG. 3, illustrated is a circuit diagram corresponding to the on-board charger 102 of FIG. 2, in accordance with an embodiment of the disclosure. As shown, the on-board charger 102 is arranged to be coupled to a 3-phase AC power supply 202 for drawing electrical power for charging the battery 104. The on-board charger 102 includes an integrated active filter rectifier 110 which corresponds to the input stage 216 of FIG. 2, and a DC/DC converter 112 that corresponds to the output stage 220 of FIG. 2. The active filter rectifier 110 includes the AC machine 108 and the inverter driver 106. The on-board charger 102 also includes the measurement unit 214 and the measurement unit 222, associated with the input stage 216 and the output stage 220, respectively. The measurement unit 214 is divided into a first part, 214a, which monitors the input voltage upstream of rectifiers 302, and a second part, 214b, which monitors current downstream of the rectifiers 202. The measurement unit 214 is associated with the input control 218, shown with an arrow, representing connection between the measurement unit 214 and the input control 218 (such as the controller). The measurement unit 214 and the input control 218 are in use coupled to the power supply 202. The measurement unit 222 is associated with the output control 224, shown with an arrow, representing connection between the measurement unit 222 and the output control 224 (such as the controller).

In one exemplary configuration, the input stage is constituted by an integrated active filter rectifier 110 that comprises one pair of diodes 302 for each phase of a three-phase mains power supply and a third harmonic current injection circuit 360. The third harmonic current injection circuit 360 comprises the fast-commuted switches 320, the inductors 108 of the AC machine, and the low-frequency bidirectional switches 304. Notably, the integrated active filter rectifier 110 includes three branches, each branch connectable to one phase of a three-phase mains power supply, i.e. the power supply network 202.

Each of the three branches includes a pair of diodes 302 and a pair of active power switches 304. The pair of active power switches 304 are connected in anti-series. Therefore, the integrated active filter rectifier 110 includes three low frequency bridge legs, wherein each low frequency bridge leg is composed of two active power switches 304 having antiparallel diodes 305 and two diodes 302, with the two active power switches 304 connected with the two diodes 302. According to an embodiment, each of the plurality of active power switches 304 comprises a MOSFET device, and the diodes 305 are provided by intrinsic body diodes of the MOSFET devices. The skilled person will appreciate that, in this arrangement, the intrinsic diode provided by a MOSFET device is used in place of a stand-alone diode 305, and the intrinsic diode is connected in parallel to the MOSFET device. In another embodiment, the plurality of active power switches 304 may include another transistor device, such as insulated-gate bipolar transistor (IGBT), instead of the MOSFET device.

As previously explained, the on-board charger 102 also includes the AC machine 108 and the inverter drive 106. The AC machine 108 and the inverter drive 106 are the primary elements of an electrical vehicle, and are associated with the traction mode of the electrical vehicle. The AC machine 108 will typically be a three-phase AC motor, including an arrangement of three phase inductors La, Lb and Lc. As shown, the AC machine 108 is coupled to the inverter drive 106.

In one embodiment, the inverter drive 106 includes six active power switches 320. The active power switches 320 of the inverter drive 106 may be similar to the active power switches 304 of the integrated active filter rectifier 110. For example, each of the active power switches 320 comprises a transistor device and a diode connected in parallel to the transistor device. Further, the transistor device may be a MOSFET device, with the diode optionally being an intrinsic body diode of the MOSFET, or an IGBT.

As shown, the on-board charger 102 also includes an output stage 220, which primarily comprises the DC/DC converter 112. The on-board charger 102 further includes a first capacitor C1 connected across an input of the DC/DC converter 112 and a second capacitor C2 connected across an output of the DC/DC converter 112. The first capacitor C1 is configured to support commutation of the active power switches 320 of the inverter drive 106 and to provide the necessary current path for the imposed injection current through the inductors 108. Capacitor C1 provides power to the power switches 320 during the moments when there is insufficient voltage difference between the phases of the alternating current mains supply to forward bias through any of the rectifier diodes 302. To ensure sinusoidal controllability of the mains currents, the output voltage of the integrated active filter rectifier 216 should be determined directly by the diode bridge rectifier 302 and hence exhibits a six-pulse shape. This sets an upper limit on the size of capacitor C1 for proper converter operation. The first capacitor C1 presents a small capacitance, typically of a few tens to a few hundreds of microfarads.

When the on-board charger 102 is used for charging the battery 104, the integrated active filter rectifier 110 receives electrical power from the power supply 202, thereafter an output of the integrated active filter rectifier 110 is fed to the DC/DC converter 112, and then an output of the DC/DC converter 112 is supplied to the battery 104 for charging. The integrated active filter rectifier 110 is configured to use at least one phase inductor (La, Lb, or Lc) of the AC machine 108 and at least one leg (i.e. one of the three branches having the pair of active power switches 320) of the inverter drive 106 to perform power factor correction of an AC supply. As shown, the phase inductors La, Lb, Lc are coupled to first, second and third branches of the inverter drive 106, respectively, each branch carrying the pair of active power switches 320.

It will be evident that when power supply network 202 is a three-phase AC power supply network, for each phase, each leg of the input stage 216 comes into operation sequentially (for charging the battery 104). Each leg may be constituted by the pair of diodes 302 connected to the pair of active power switches 304 of the integrated active filter rectifier 110.

According to an embodiment, during three-phase operation, the active power switches 304 (i.e. current injection switches) of the integrated active filter rectifier 110 are modulated at a frequency of twice the mains frequency, i.e. two-times the frequency of the three-phase AC power supply network 202. For example, each of these active power switches 304 conducts during 120° within a 360° mains period, in such a way that active current injection always occurs into only one of the three mains phase. In conjunction with the active power switches 304 and the phase inductors La or Lb or Lc (i.e. one of the mains phases), the active power switches 320 (i.e. high frequency inverter drive bridges constituted by each branches) of the inverter drive 106 are commutated at high frequency. This allows the active power switches 320 of the inverter drive 106 to work as a dedicated current injection converter, which serves as an active harmonic filter for achieving sinusoidal input currents. Notably, the active power switches 320 of the inverter drive 106 function as high frequency Pulse Width Modulation (PWM) bridge for current regulation, therefore no additional costly high frequency power semiconductors are needed for that. Additionally, the phase inductors La or Lb or Lc of the AC machine 108 acts as current injection inductor. Further, the output voltage of the integrated active filter rectifier 110 exhibits a six-pulse shape, determined directly by the diode bridge rectifier (i.e. the diodes 302). Further, the DC/DC converter 112 provides voltage regulation and dynamic current limitation to the battery 104. Furthermore, the DC/DC converter 112 controls a constant output current (constant power demand) in order to assure high power factor operation.

Notably, the on-board charger 102 includes a control scheme having two control loops. For example, one control loop constituted by the measurement units 214a and 214b, and the input control 218 for regulating the current injected back into the mains phases by the active power switches 320 of the inverter drive 106 and the phase inductors La or Lb or Lc of the AC machine 108. Typically, the input control 218 is operable to generate control signals, based on the measurement data of the measurement units 214a and 214b for controlling operation of the active power switches 304 and 320 of the third harmonic current injection circuit 110. Further, a second control loop constituted by the measurement unit 222 and the output control 224 for regulating the output current of the DC/DC converter 112. Typically, the output control 224 is operable to generate control signals, based on the measurement data of the measurement unit 214 for controlling the output current of the DC/DC converter 112. Typically, based on the control signals provided by the output control 224 a constant output current (in order to assure high power factor operation) is provided by the DC/DC converter 112 for charging the battery 104.

The on-board charger 102 may also used for powering external loads using the battery 104 as a power bank. Typically, the on-board charger 102 or various elements thereof is passively used for powering external loads.

In an embodiment, the external loads may be a single-phase or three-phase AC load, or a DC load. For powering the external load using the battery 104, an input of the integrated active filter rectifier 110 is coupled to the external load, an output of the integrated active filter rectifier 110 is fed from an input of the DC/DC converter 112, and an output of the DC/DC converter 112 is supplied from the battery 104. Further, during powering the external loads, the integrated active filter rectifier 110 is configured to use at least one phase inductor La, Lb, Lc of the AC machine 108 and at least one leg (i.e. one of the three branches having the pair of active power switches 320) of the inverter drive 106 to perform power factor correction.

Figure 4:
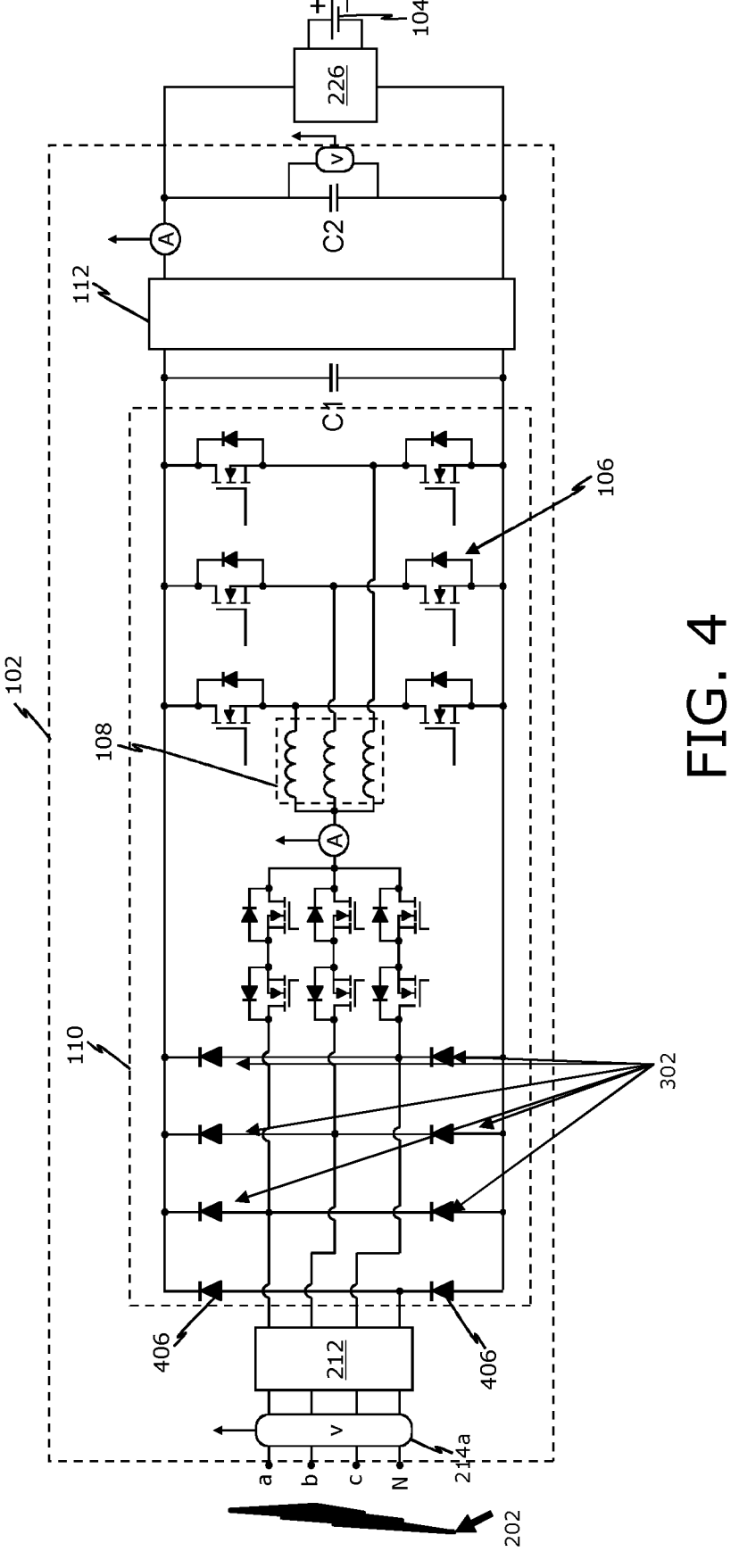
FIGS. 4-7 are illustration of circuit diagrams depicting exemplary implementation of on-board chargers, in accordance with various examples of the disclosure.

Referring now to FIG. 4, illustrated is a circuit diagram depicting an exemplary implementation of an on-board charger 102, in accordance with an embodiment of the disclosure. The on-board charger 102 is similar to the on-board charger 102, shown and explained in conjunction with FIG. 3. The on-board charger 102 is operable to charge the battery 104 using a power supply network, such as a three phase AC power supply network having a neutral phase (or wire) N. The integrated active filter rectifier 110 of the on-board charger 102 is shown to include a pair of diodes 406 connected to the neutral wire N in parallel. The pair of diodes 406 is configured to be a fourth branch used only in single-phase and DC operations (as they are not needed for three-phase operation).

Figure 5:
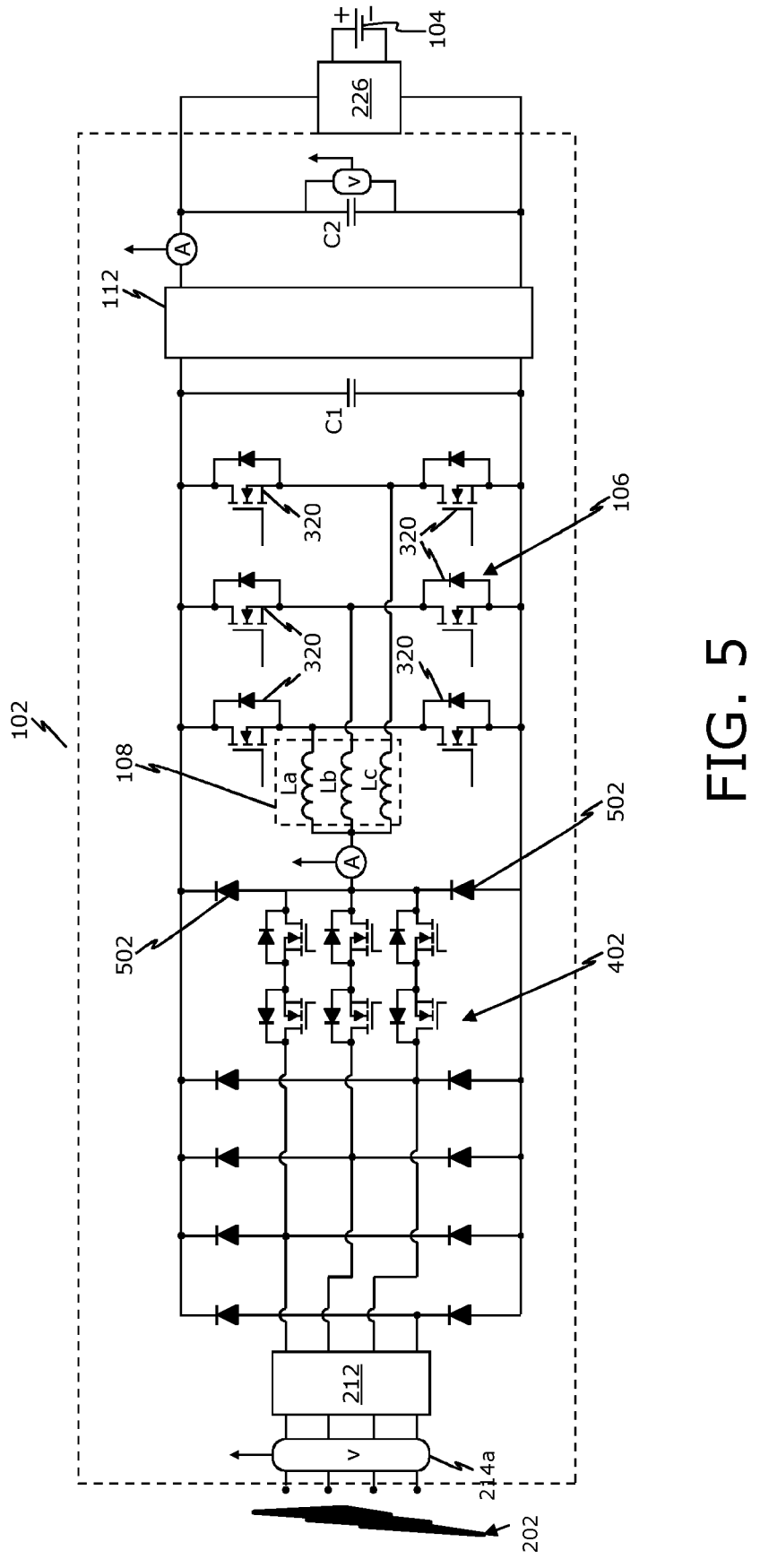

Referring now to FIG. 5, illustrated is a circuit diagram depicting an exemplary implementation of an on-board charger 102, in accordance with another embodiment of the disclosure. The on-board charger 102 is similar to the on-board chargers shown and explained in conjunction with FIGS. 3 and 4. As shown, the on-board charger 102 includes a pair of free-wheeling diodes 502 placed as supplementary protection to the current injection switches 320 of the inverter drive 106. This offers an operating safety level in the event of any drift or loss of control. In practice, the pair of free-wheeling diodes 502 enables blocking of the current injection switches 320, so that the current from the phase inductors La, Lb, Lc can then continue to circulate through one of the pair of free-wheeling diodes 502. Ideally, the pair of free-wheeling diodes 502 never conduct.

Figure 6:
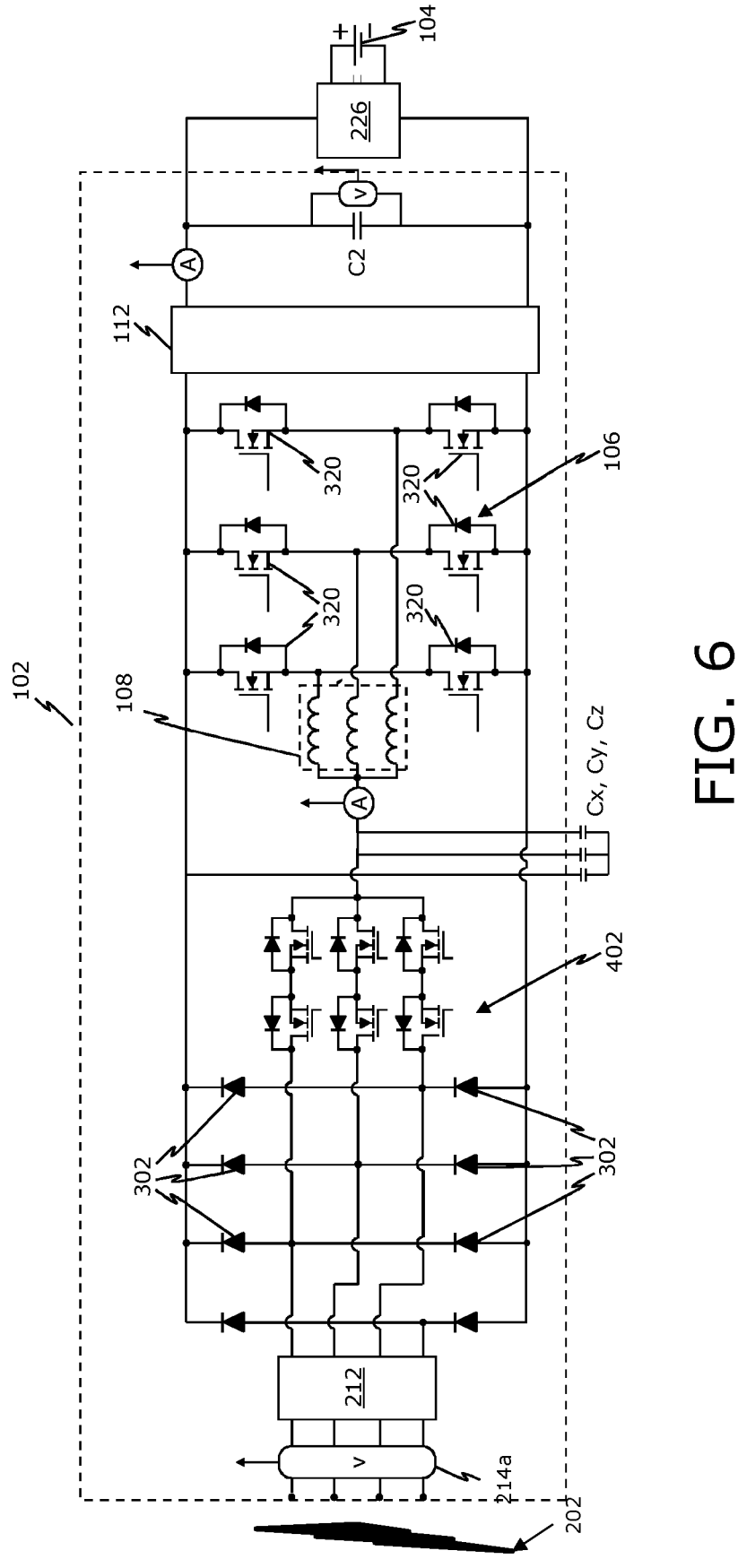

FIG. 6 is a circuit diagram depicting an exemplary implementation of an on-board charger 102, in accordance with another embodiment of the disclosure. The on-board charger 102 is similar to the on-board chargers shown and explained in conjunction with FIGS. 3 and 4. As shown, the on-board charger 102 includes capacitors Cx, Cy and Cz on the DC side (i.e. these are input filter capacitors that would otherwise normally be part of the AC EMI filter 212). It is to be understood that capacitor Cx, Cy and Cz substitute for the capacitor C1 (shown in FIG. 3) connected across the input of the DC/DC converter 112. This enables the commutation paths of the buck converter 112 and the injection switches 320 of the inverter drive 106 to be shortened, as well as reducing the conduction losses due to the reduction of the current ripple through the input diode bridges constituted by the diodes 302 of the integrated active filter rectifier 110.

Figure 7:
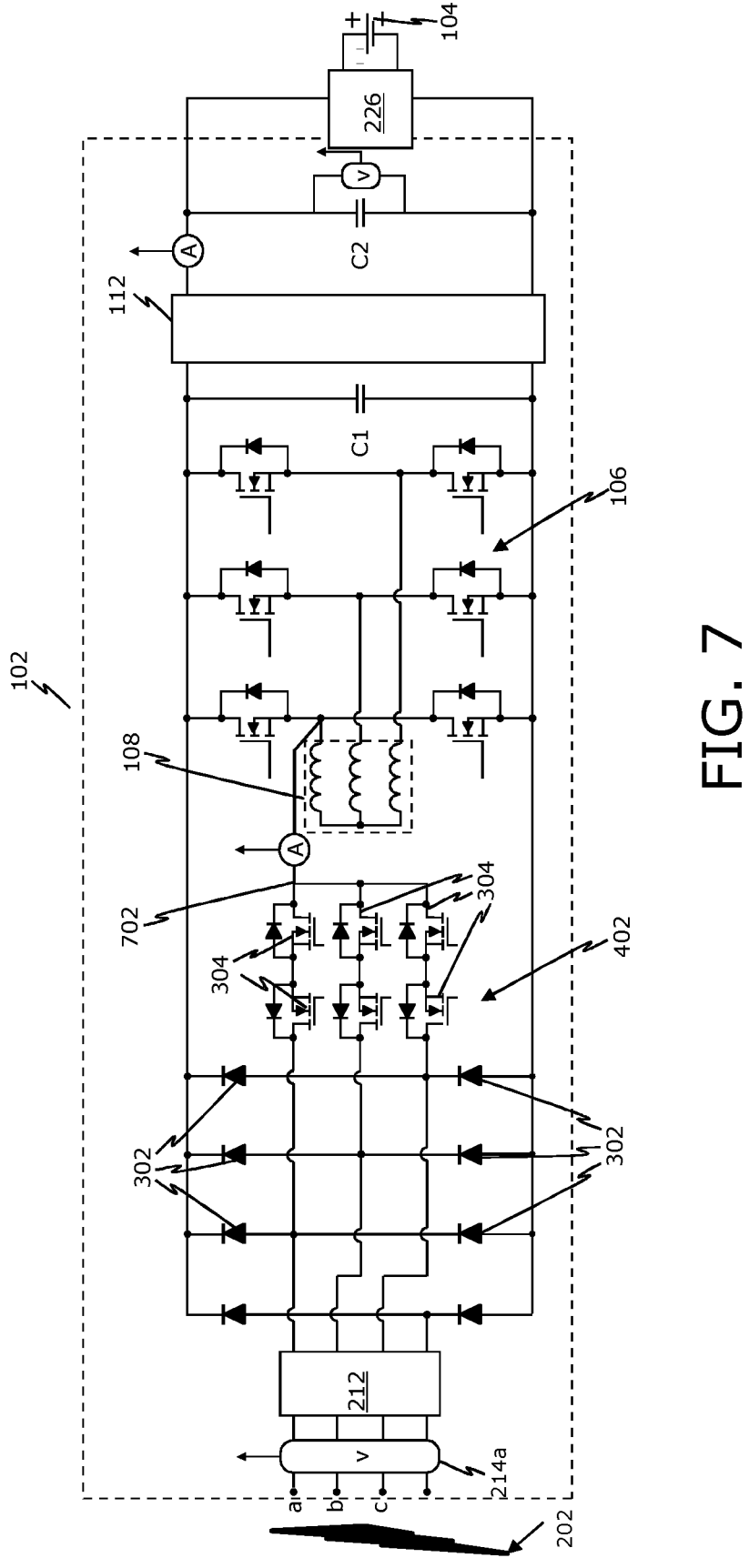
Figure 9A:
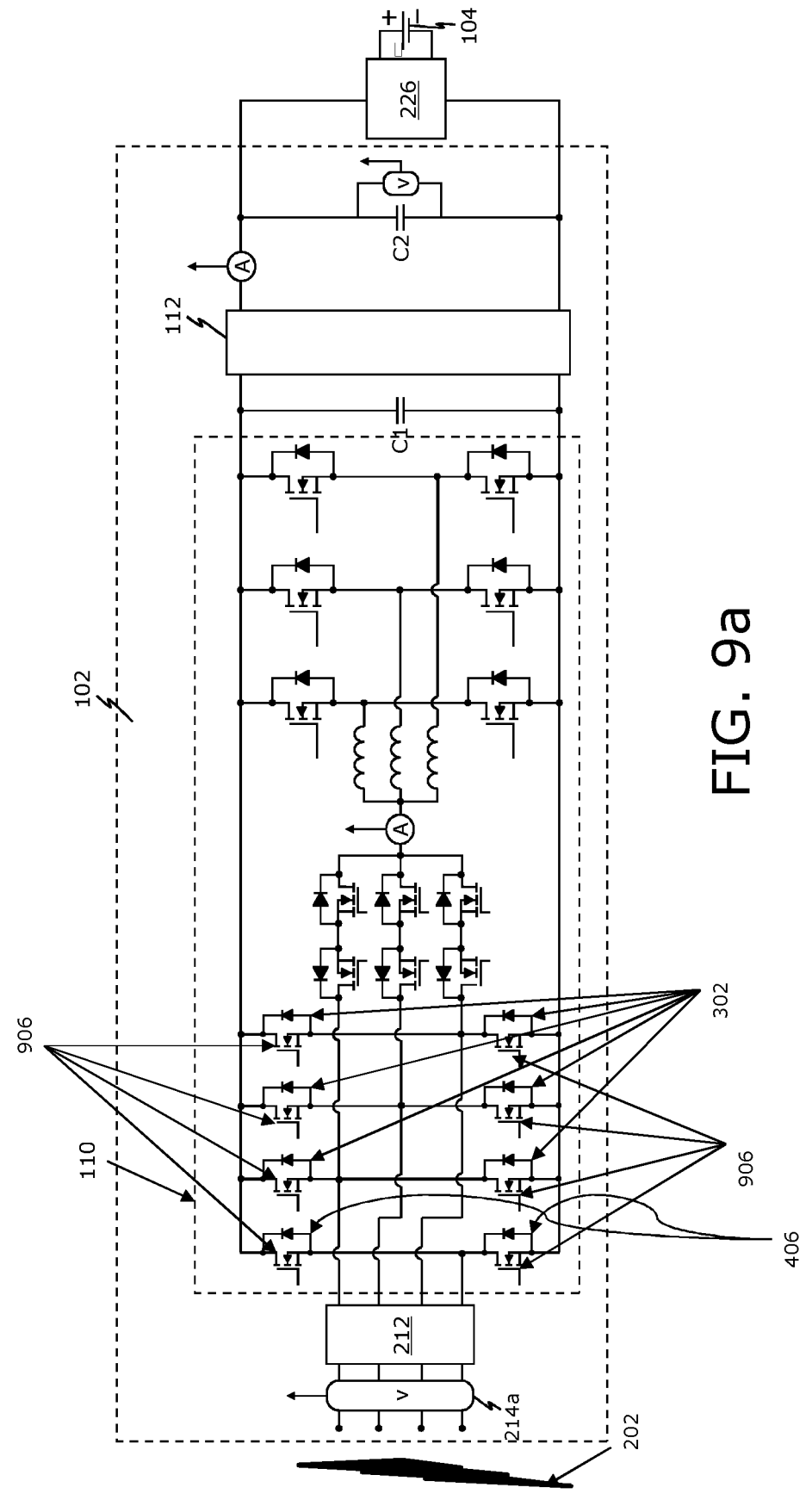
FIGS. 9a and 9b are illustration of on-board chargers having bidirectional power flow capacity, in accordance with examples of the disclosure.

FIG. 7 is a circuit diagram depicting an exemplary implementation of an on-board charger 102, in accordance with another embodiment of the disclosure. The on-board charger 102 is similar to the on-board chargers shown and explained in conjunction with FIGS. 3 and 4. As shown, the integrated active filter rectifier 110 includes a pair of diodes 302 (or active power switches, as shown in FIG. 9a) belonging to one branch for each phase of a three-phase a, b, c mains power supply. Further, each of the pair of diodes 302 (or active power switches, as shown in FIG. 9a) are coupled together at a common point 702, and the common point 702 is coupled to one of the phase inductors (La, Lb, Lc) of the AC machine 108. In other words, the common point 702 of the active power switches 304 is connected to one of the phase inductor La, Lb, Lc, whose corresponding bridge does not operate during the charging mode. The main advantage of this construction is that the access to the motor neutral point 312 (shown in FIG. 3) is not required.

Figures 8A, 8B:
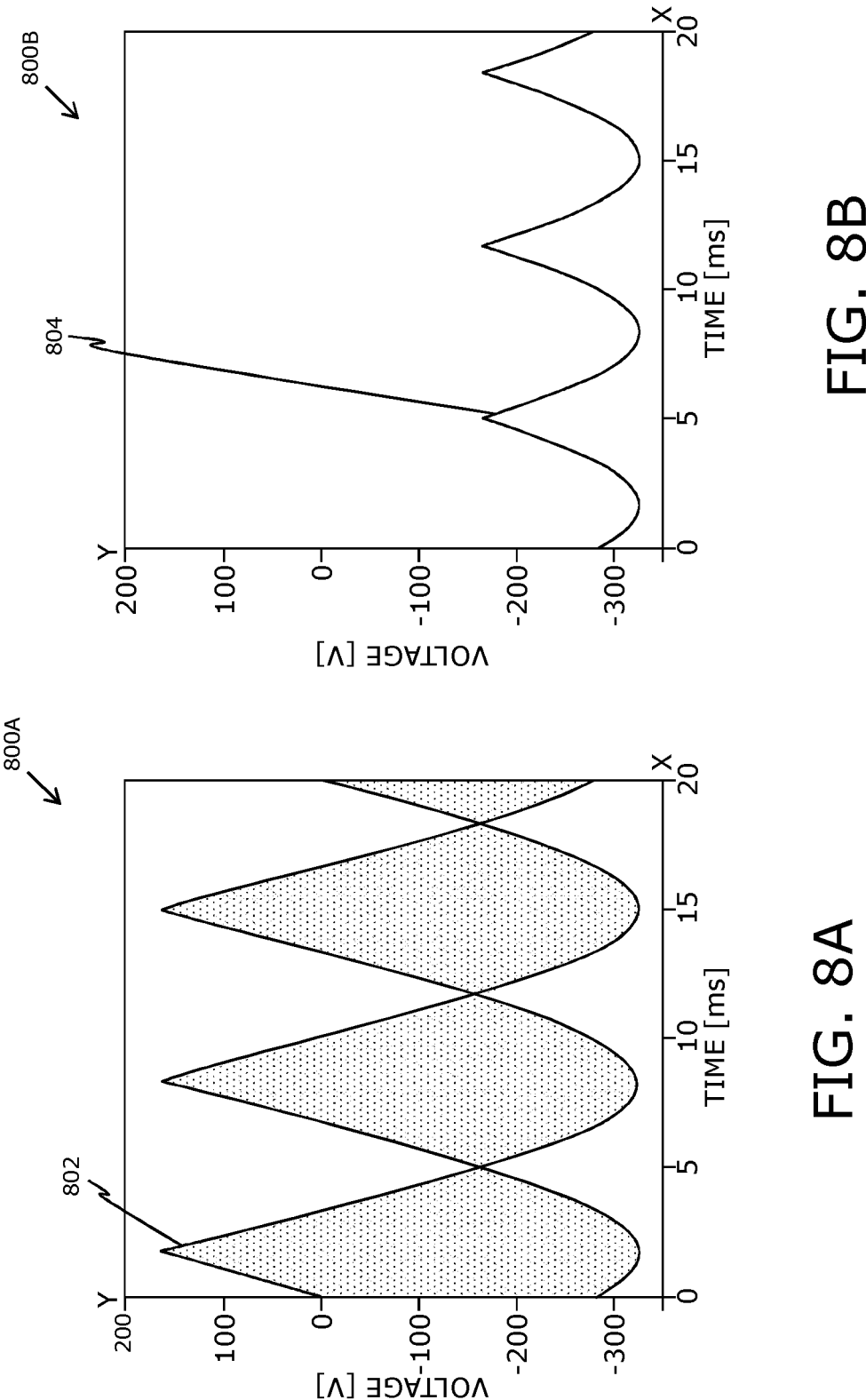
FIGS. 8A-B are illustration of a graph that depicts Common-Mode Voltage (CMV) on a negative battery pole respectively for a known integrated on-board charger and for an on-board charger of the present, in accordance with an example of the disclosure.

Referring now to FIG. 8A, illustrated is a graph that depicts Common-Mode Voltage (CMV) on a negative battery pole for a known integrated on-board charger (not shown). FIG. 8A is a graphical representation 800A of a Common-Mode Voltage (CMV) pattern with respect to time. As shown, the plot 800A represents time (in milliseconds) on the X-axis and values of Common-Mode Voltage (in volts) on the Y-axis. The plot 800A represents a CMV waveform 802 of the known integrated on-board charger. It will be appreciated that the existence of high frequency components in the CMV waveform 802 on the negative pole of the vehicle battery will require very strong Electromagnetic Interference (EMI) filtering to be incorporated into the known integrated on-board charger.

Referring now to FIG. 8B, illustrated is a graph that depicts Common-Mode Voltage (CMV) on a negative battery pole for an on-board charger of the disclosure (such as the on-board charger 102), in accordance with an embodiment of the disclosure. FIG. 8B is a graphical representation 800B of a Common-Mode Voltage (CMV) pattern with respect to time. As shown, the graphical representation 800B represents time (in milliseconds) on the X-axis and values of Common-Mode Voltage (in volts) on the Y-axis. The graphical representation 800B represents a CMV waveform 804 of the on-board charger of the disclosure, according to various embodiments shown and explained herein above. It will be appreciated that the absence of high frequency components in the CMV waveform 804 imposes a very much lower requirement for EMI filtering for the on-board charger of the disclosure in comparison to the known on-board charger whose CMV is shown in FIG. 8A.

In addition to the above, the on-board charger (shown and explained herein above) of the disclosure enables the reduction of the overall losses as compared to known integrated on-board chargers. Typically, with the on-board charger of the disclosure, the PWM contribution (provided by the active power switches of the inverter drive) represents only a small fraction, for example of only 6%, of the total delivered energy. Notably, a major part of the energy is delivered via the rectifier diodes (such as diodes 302 of the integrated active filter rectifier 110) without having switching losses. Therefore, low cost high efficiency Si-based devices can be used here in conjunction with the on-board charger of the disclosure. Further, the same reasoning is valid for the current through the AC machine 108, whose RMS value represents less than 14% of the RMS phase current consumed from the grid, corresponding to up to 44% lower copper losses as compared to a known integrated on-board charger.

Referring now to FIG. 9a, illustrated is an on-board charger 102 configured for bidirectional power flow, in accordance with an embodiment of the disclosure. The on-board charger 102 is similar to the on-board chargers 102, shown and explained in conjunction with FIGS. 3 and 4. However, as shown the in FIG. 9, the integrated active filter rectifier 110 includes active power switches 906 at the position of the diodes 302, as shown in FIGS. 3 and 4. The Figure shows each active power switch 906 having a diode connected in parallel with a transistor. Optionally, each active power switch 906 may be a metal oxide semiconductor field effect transistor (MOSFET device). If the active power switches are MOSFETS, the parallel connected diodes may be provided by intrinsic body diodes of the MOSFET devices.

In another embodiment, instead of replacing the diodes 302 with MOSFETs, a bipolar transistor device is arranged in parallel with each of the diodes 302. The bipolar transistor devices may conveniently be insulated-gate bipolar transistors (IGBTs).

Additionally in FIG. 9a, the DC/DC converter 112 is a bidirectional device to support bidirectional power flow. By using active power switches 906, instead of simply diodes 302, and bidirectional DC/DC converter 112, power can be drawn from the vehicle battery 104 through the on-board charger. So with this arrangement, the vehicle battery 104 can be used as a power bank for powering external electrical or electronic devices.

Figure 9B:
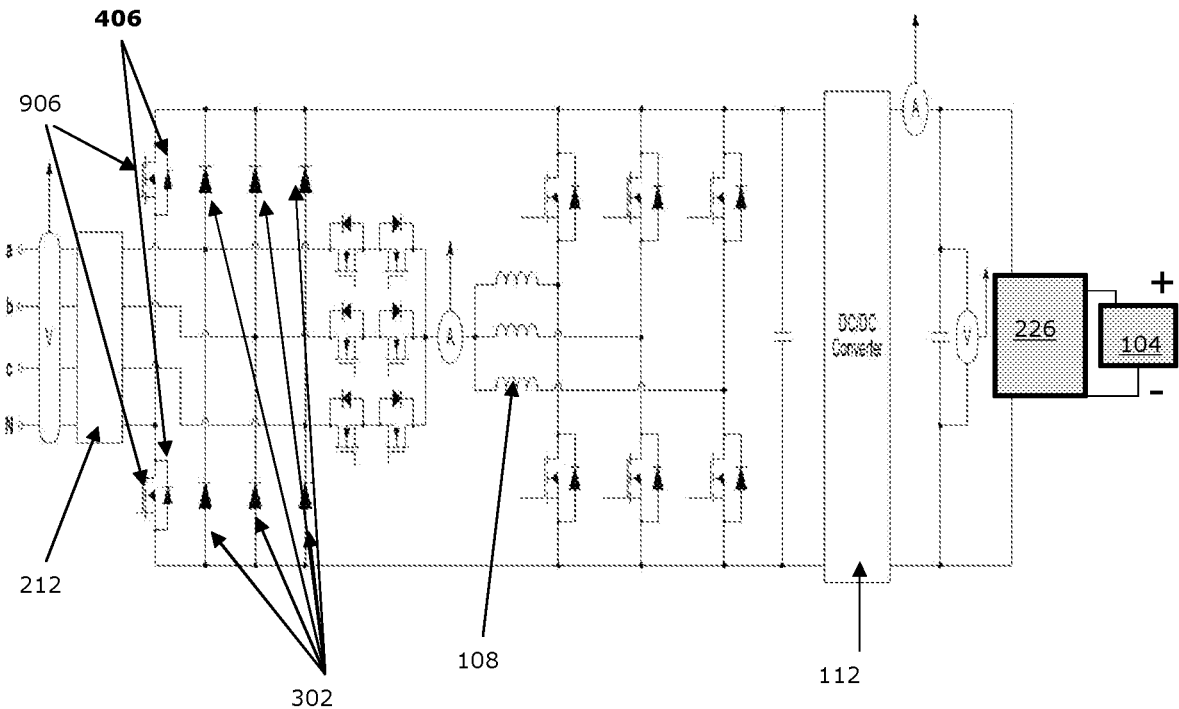

FIG. 9b is based on FIG. 4, and shows the addition of a switch 906 in parallel only with the diodes 406, and not with the other diode rectifiers 302. The elimination of the switches 406 in parallel with the diode rectifiers shown in FIG. 9a reduces cost and component count, but is still sufficient to enable bidirectional current flow and in particular the use of the vehicle battery as a power bank to supply single-phase AC to an external load.

Figure 10:
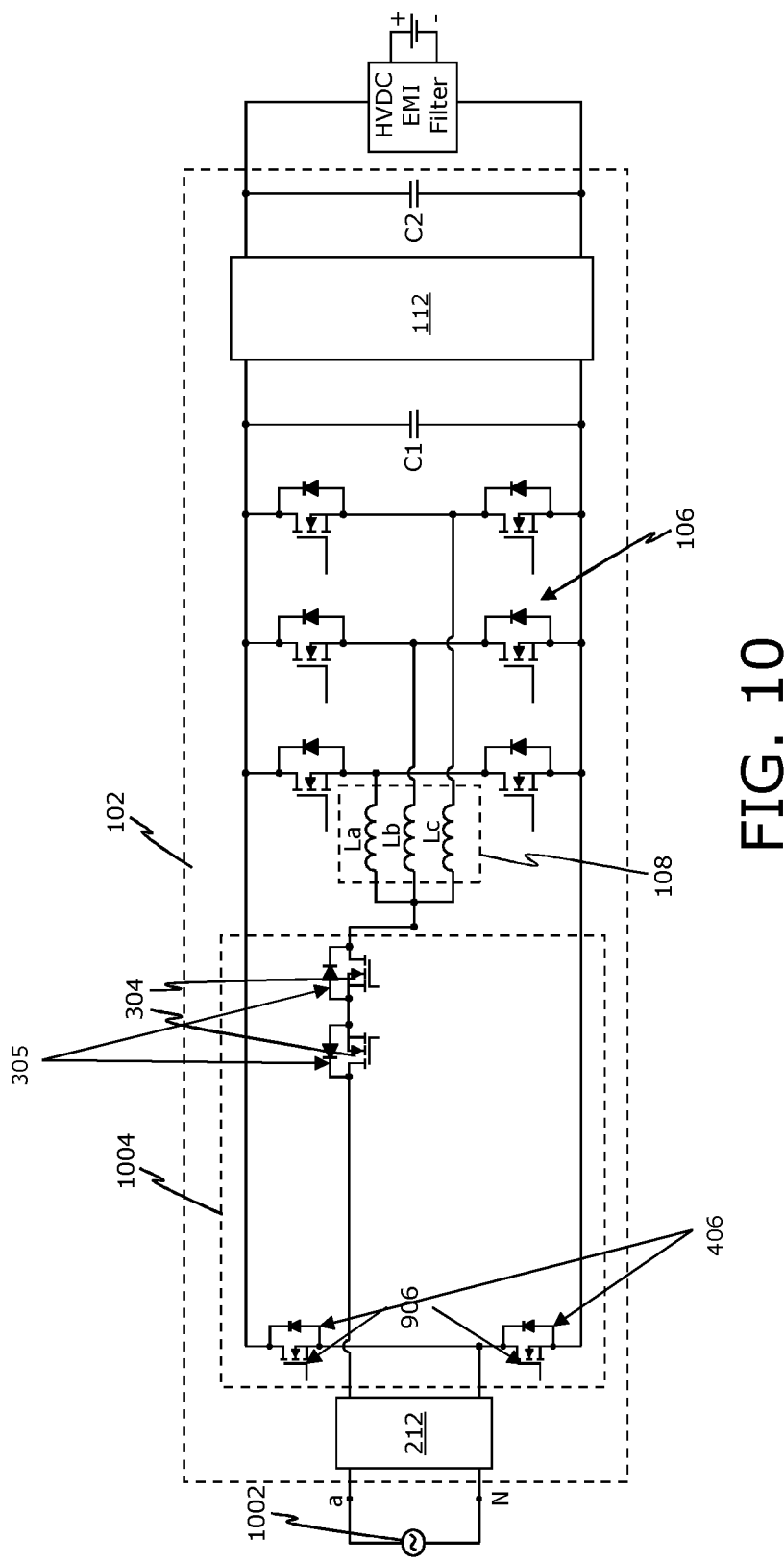
FIG. 10 is an illustration of a circuit diagram of an on-board charger configured to operate from a single-phase AC power source, in accordance with an example of the disclosure.

FIG. 10 is a simplified and partial circuit diagram of an on-board charger 102 in accordance with an embodiment of the disclosure configured to connect to a single-phase AC power source to charge the vehicle battery, and to allow bidirectional power flow. The on-board charger 102 is configured to support charging from a single-phase AC power supply 1002 by using elements of the integrated active filter rectifier (such as the integrated active filter rectifier 110, shown in FIG. 9) as a bridgeless totem-pole power factor correction rectifier. Typically, the on-board charger 102 includes a control arrangement (not shown) such as the input control 218, to modulate at least one leg, such as a leg constituted by active power switches 304, of the inverter drive 106 at high frequency to generate a sinusoidal current through a corresponding phase inductor La, Lb, or Lc of the AC machine 108. It will be appreciated that the circuit shown in FIG. 9 represents a configuration to which an on-board charger as shown in earlier Figures can be switched when it is desired to charge the battery of a vehicle from a single-phase AC supply rather than from a 3-phase AC supply, rather than being an alternative form of charger.

As shown, the power supply network 1002 is connected between neutral and one of the phases (such as phase a). The active power switches (bidirectional switches) 304 of the connected phase are turned-on, so that the path between this phase 'a' and the neutral of the AC machine 108 is short-circuited. An interleaved operation of the three legs of the inverter drive 106 is beneficial regarding conduction losses and ripple reduction of the injected current. To enable the supply of an AC load or the injection of current into the grid active power switches 906 are used in parallel with the rectifiers 406. The active power switches 906 can as well be used to improve efficiency by means of synchronous rectification during charging.

Figure 11:
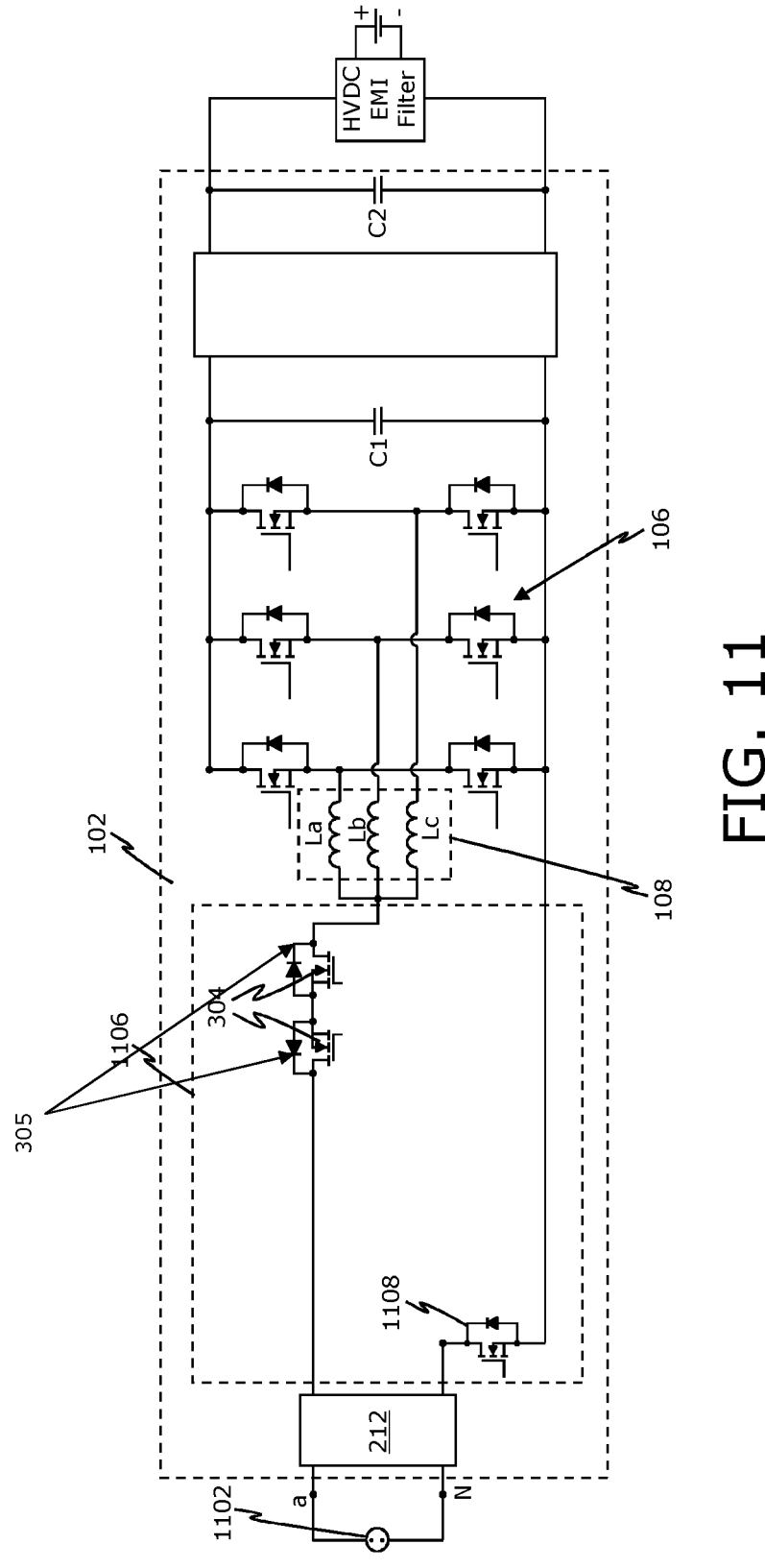
FIG. 11 is an illustration of a circuit diagram of an on-board charger configured to operate from a DC power source, in accordance with an example of the disclosure.

FIG. 11 is a simplified and partial circuit diagram of an on-board charger 102 in accordance with an embodiment of the disclosure configured to use a DC power source to provide charging current to the vehicle battery, and to allow bidirectional power flow, in accordance with an embodiment of the disclosure. The on-board charger 102 is configured to support charging from a DC power supply 1102 by using elements of the integrated active filter rectifier 110 as a DC/DC converter. Further, the on-board charger 102 includes a control arrangement (not shown, such as the input control 218 shown in FIG. 2) to modulate at least one leg (such as a pair of active power switches belonging to one branch of the inverter drive 106) of the bridge at high frequency to control a direct current through a corresponding phase inductor (such as the phase inductors La, Lb, Lc) of the AC machine 108.

As also shown in FIG. 11, the DC power supply 1102 is connected between two input terminals a and N. The active power (or bidirectional) switches 304 of the connected phase are turned-on, so that the path between the connected phase and a neutral point (or a common point in which all the phase inductors La, Lb, Lc) of the AC machine 108 is short-circuited. Further, at least one leg of the three-phase bridge (i.e. one of the three branches of the inverter drive 106) is modulated at high frequency to control the DC current through the corresponding motor phase inductor (i.e. one of the phase inductors La, Lb, Lc). An interleaved operation of the three legs of the inverter drive 106 is beneficial regarding to conduction losses and reduction of the output current ripple. For charging purposes, the active power switch 1108 offers a return path to the DC current. The active power switch 1108 enables synchronous rectification as well as the supply of a DC load (i.e. using the vehicle battery as power bank for a direct current load). It will be appreciated that the circuit shown in FIG. 11 represents a configuration to which an on-board as shown in earlier Figures can be switched when it is desired to charge the battery of a vehicle having an on-board charger according to the disclosure of this application from a DC supply instead of from an AC supply, rather than being an alternative form of charger. The functionality represented by the configuration illustrated in FIG. 11 is optional, as is that of FIG. 10, but it is clearly desirable to provide an on-board charger that enables the charging of the battery of a battery-powered vehicle from any of a 3-phase AC, single-phase AC and DC power source.

Figures 12A, 12B, 12C:
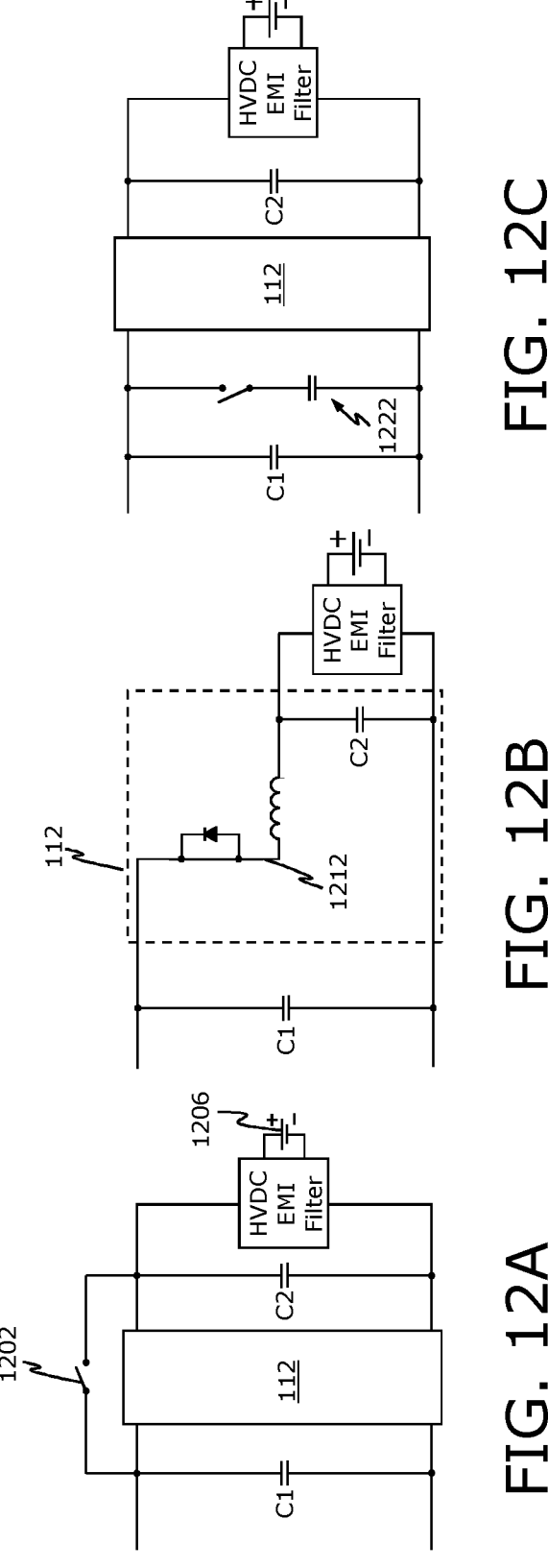
FIGS. 12A-12C are illustration of circuit diagrams representing various arrangements for DC/DC converters for an on-board charger, in accordance with various example of the disclosure.

FIGS. 12A-12C, are circuit diagram representing various arrangements for a DC/DC converter for an on-board charger (such as the on-board chargers 102), in accordance with various embodiment of the disclosure. In particular, FIGS. 12A-12C illustrate various arrangements for the DC/DC converters along with capacitors (such as the first and second capacitors C1 and C2) coupled in parallel to an input and an output of the DC/DC converters.

As shown in FIG. 12A, a switching device 1202 is provided to enable a DC/DC converter 112 to be bypassed while an AC machine (such as the AC machine 108) is propelling the electric vehicle but not when a charger (such as the charger having such DC/DC converter arrangements) is providing charging current to the battery 1206 of the electric vehicle. In other words, the switching device 1202 is operable to bypass the DC/DC converter 112, so the DC/DC converter 112 is used only in charging mode.

Referring now to FIG. 12B, illustrated is a DC/DC converter 112 which is configurable to provide an internal path 1212 for current to flow from an output stage of the DC/DC converter 112 to an AC machine (such as the AC machine 108 shown in earlier figures) in propulsion mode. In other words, relocating an available inverter drive dc-link with high capacitance (i.e. with capacitor C2) to the output of the DC/DC converter 112 and bypassing the DC/DC converter 112 internally during propulsion mode. In this way, a DC current flows through some of the components of the DC/DC converter 112, i.e. the DC/DC converter 112 provides a simplified internal path 1212 for current flow.

Referring now to FIG. 12C, illustrated is a DC/DC converter 112 with an additional switchable DC-link capacitor 1222. The switchable DC-link capacitor 1222 is connectable in parallel to the first capacitor C1. The capacitance of the switchable DC-link capacitor 1222 is summed with the first capacitor C1 in propulsion mode, but not in charging mode. Accordingly, the DC/DC converter 112 can work in both propulsion and charging modes.

Another alternative to the options shown in FIGS. 12a to 12c, which is not illustrated, is to implement a highly dynamic DC/DC converter, so that the required energy from the first capacitor C1 can be provided by the second capacitor C2 in a timely manner. Therefore, the DC/DC converter works in both propulsion and charging modes.

Figures 13A, 13B:
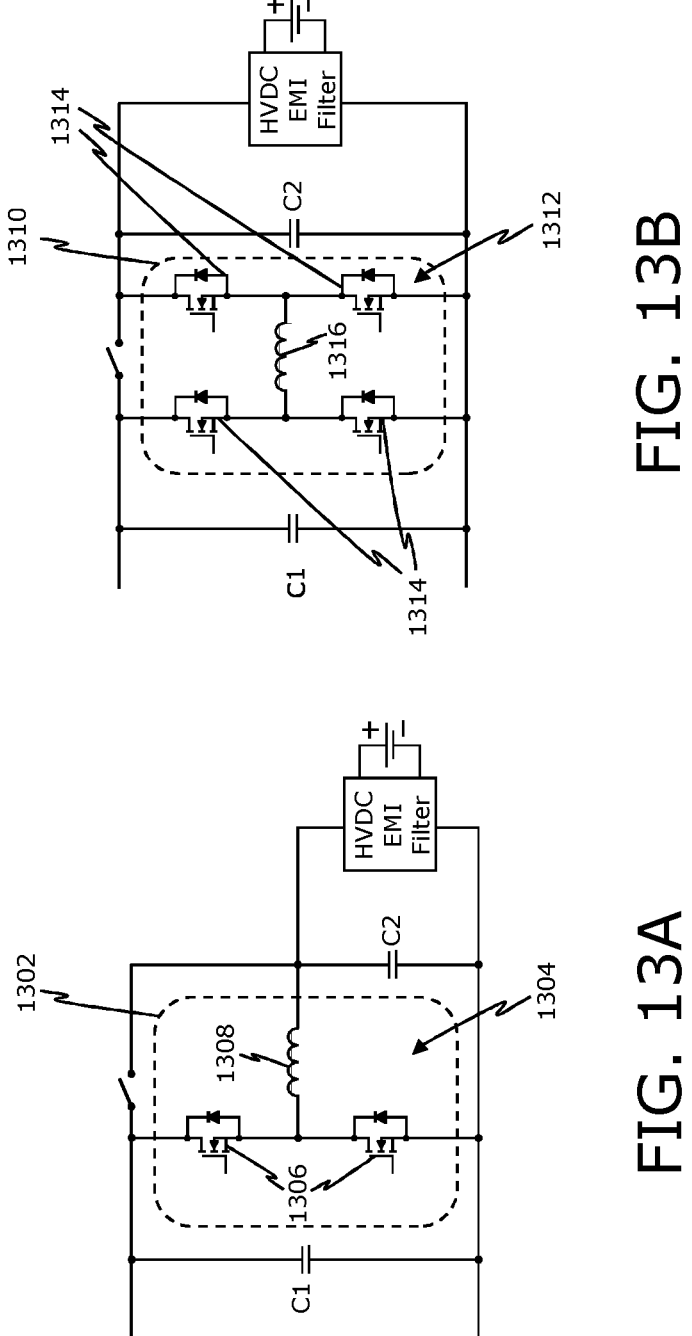
FIGS. 13A and 13B are illustrations of circuit diagrams of non-isolated DC/DC converters, in accordance with various examples of the disclosure.

Referring now to FIGS. 13A and 13B, illustrated are circuit diagrams of DC/DC converters, in accordance with various embodiments of the disclosure. According to an embodiment, the DC/DC converters are configured to support charging of nominally 400 volt batteries and to support charging of nominally 800 volt batteries. Further, the DC/DC converters includes an isolated DC/DC circuit for charging either nominally 400 volt batteries or nominally 800 volt batteries.

FIG. 13A, illustrates a DC/DC converter 1302 which includes a non-isolated step-down DC/DC circuit 1304 for charging nominally 400 volt batteries. As shown, the DC/DC circuit 1304 includes a pair of active switches 1306 and an inductor 1308. In an example, using the step-down DC/DC converter 1302 as a back-end solution, limits the application to 400 volt battery voltages, whose upper operating limit is 470 volts according to the automotive standard.

FIG. 13B, illustrates a DC/DC converter 1310 which includes a non-isolated step-down/step-up DC/DC circuit 1312 for charging either nominally 400 volt batteries or nominally 800 volt batteries. In an example, the DC/DC circuit 1312 relates to a bidirectional Buck-Boost converter. As shown, the non-isolated step-down/step-up DC/DC circuit 1312 includes two branches, each branch having a pair of active switches 1314 and an inductor 1316 coupled to the two branches of the active switches 1314. In an example, the DC/DC converter 1310 provides an operating voltage range that goes from to 450 volts to 770 volts.

The DC/DC converters 1302, 1310 of FIGS. 13A-13B are shown with a bypass arrangement using an external switching device (similar to the DC/DC converter 112, shown and explained in FIG. 12A). This allows more flexibility in choosing the most suitable DC/DC converter without degrading or having any influence on the performance during propulsion mode.

Figure 14:
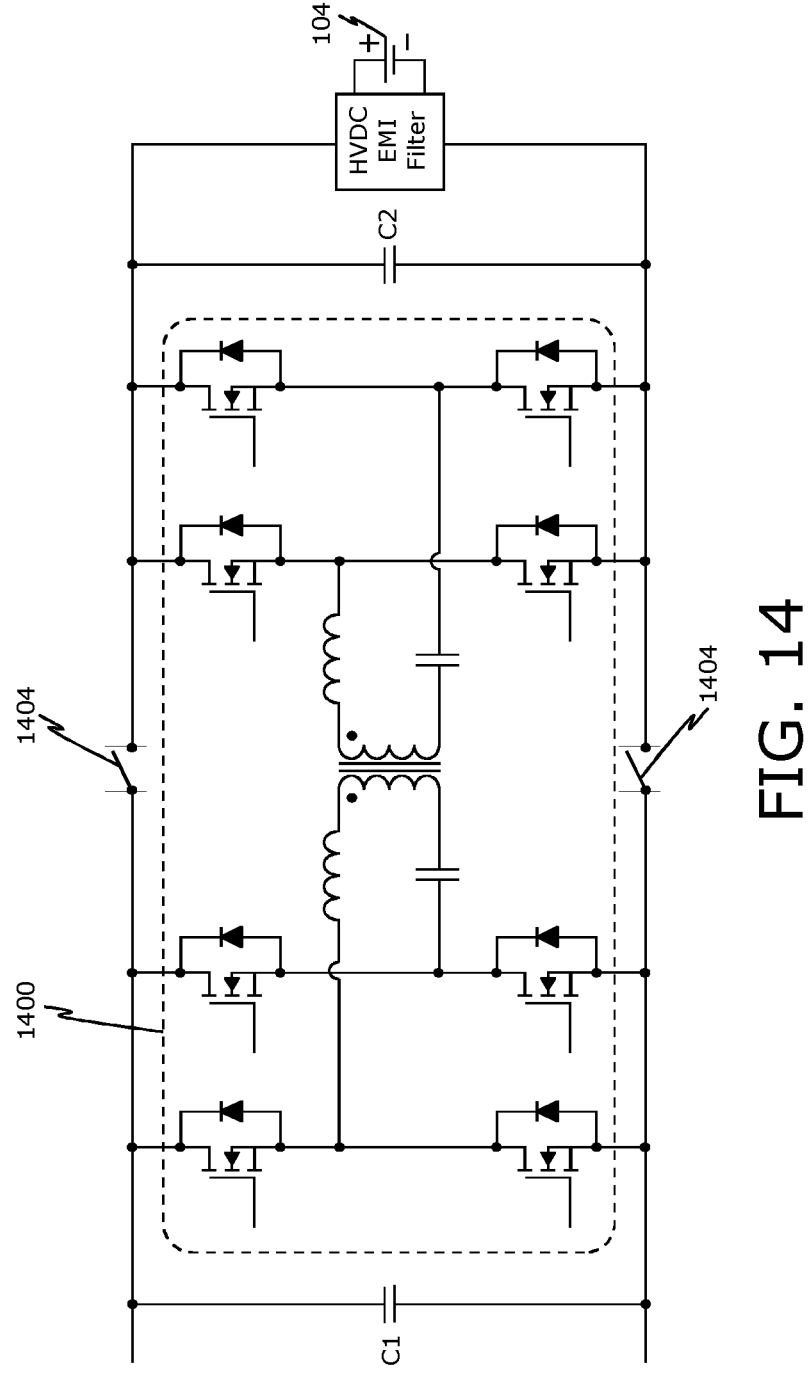
FIG. 14 is an illustration of a circuit diagram of an isolated DC/DC converter, in accordance with an example of the disclosure.

FIG. 14 is a circuit diagram of an isolated DC/DC converter, for use in an integrated charger in accordance with an embodiment of the disclosure. In this example, the isolated DC/DC converter uses CLLC resonant topology (indicated by the broken line labelled 1400). In cases where galvanic isolation is required, the isolated DC/DC converter may be used as back-end (in place of the DC/DC converters described above), and an external switching arrangement, such as switches 1404, may be used to bypass this additional stage. For example, during charging of the battery 104, the switches 1404 are open and the isolated DC/DC converter is active, and during propulsion, the switches 1404 are closed and the isolated DC/DC converter is bypassed. As a result, compliance with safety requirements is easily enabled as well as the charging of both 400 and 800 volt batteries is enabled.

Figure 15:
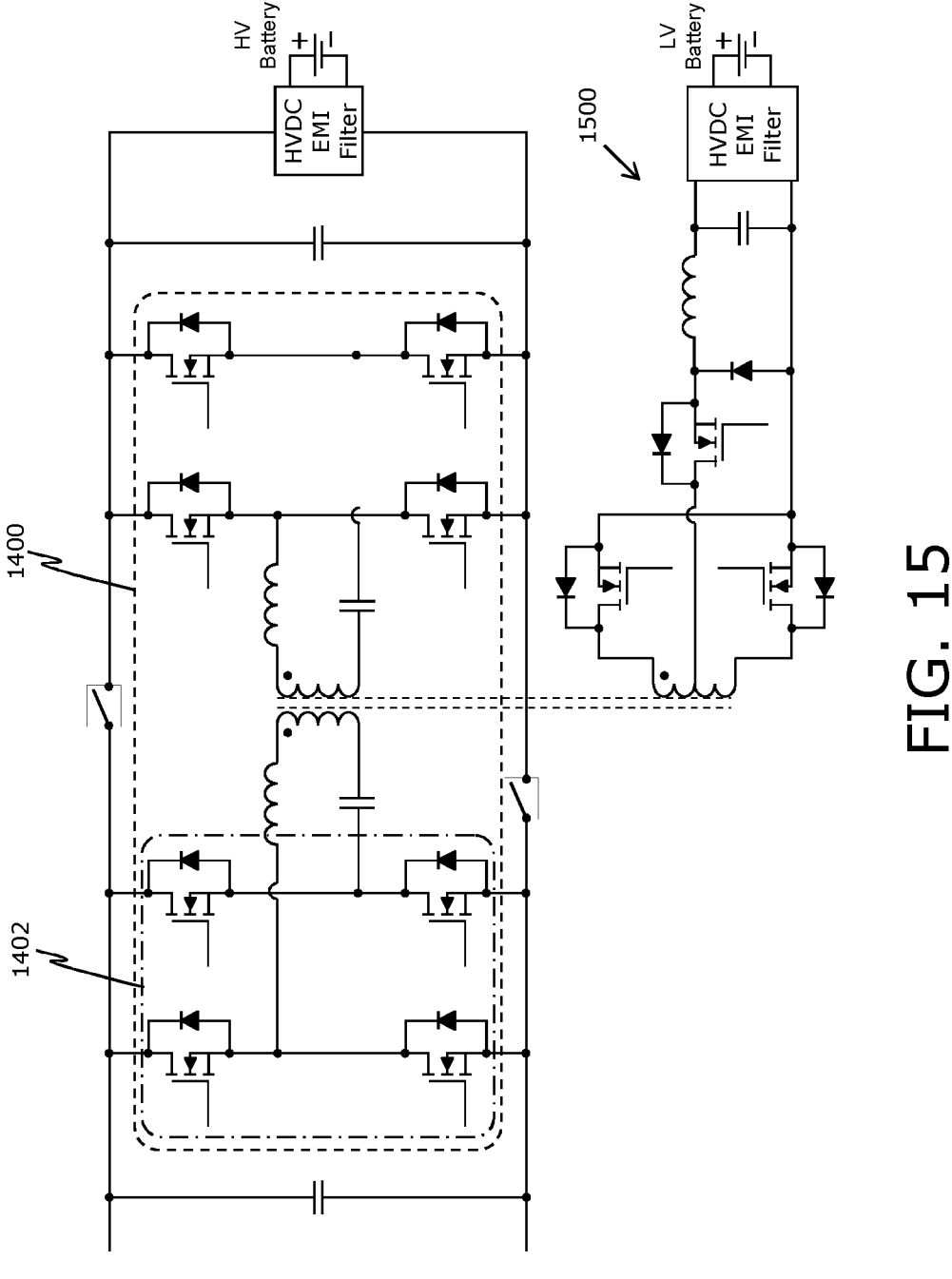
FIG. 15 is an illustration of a circuit diagram of an on-board power supply DC/DC converter, which acts as an interface between a high voltage battery and a low voltage battery in an electric vehicle, merged into the isolated DC/DC converter of FIG. 14, in accordance with an example of the disclosure.

Referring now FIG. 15, illustrated is circuit diagram of an on-board power supply DC/DC converter in conjunction with the isolated DC/DC converter of FIG. 14, in accordance with an embodiment of the disclosure. In this example, the DC/DC converter may be termed an LDC converter as it interfaces both high and low voltage batteries. As shown, this can be merged into the isolated DC/DC converter (of FIG. 14), sharing the same transformer and the high voltage side power switches. The low voltage side may be implemented by several topologies. In FIG. 15 there is shown, the use of a centre-tapped rectifier with a built-in Buck. In operation, during both propulsion and charging mode, only one bridge side 1402 is actively controlled, while the other two remaining bridges operate passively with synchronous rectification capability.

Figure 16A:
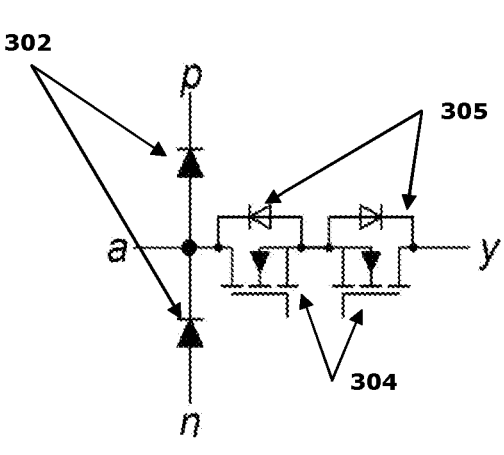
FIG. 16a, FIG. 16b and FIG. 16c and FIG. 16d and FIG. 16e are a, illustrated are alternative circuit configurations suitable for use as a low frequency bridge leg of an integrated active filter, in accordance with an example of the disclosure.
Figure 16B:
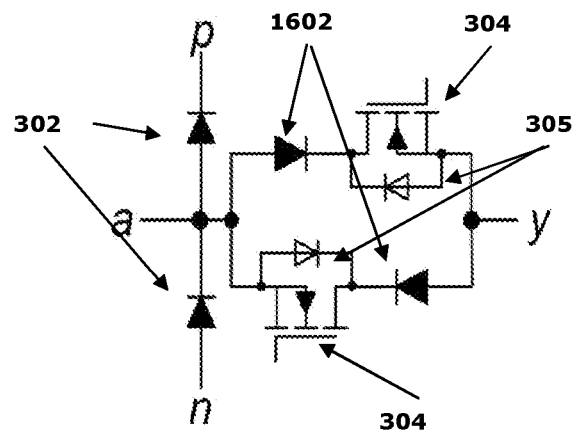
Figure 16C:
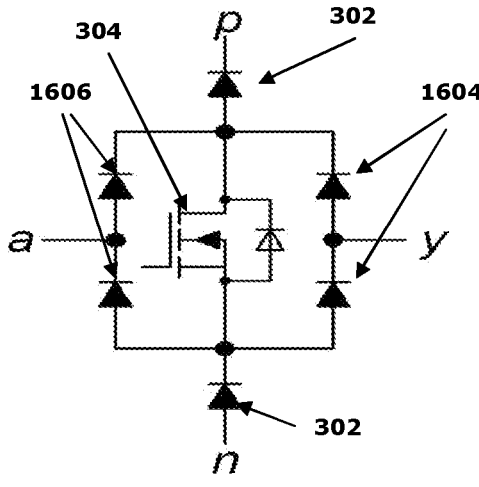
Figure 16:
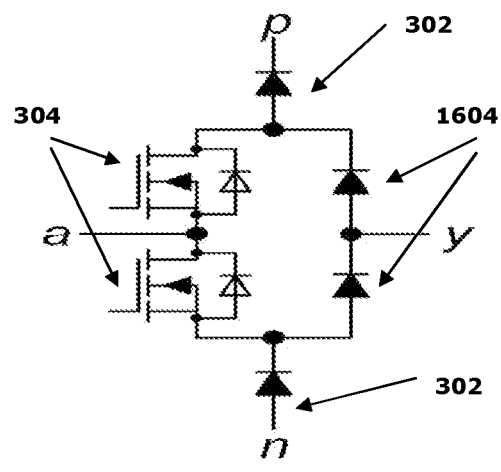
Figure 16:
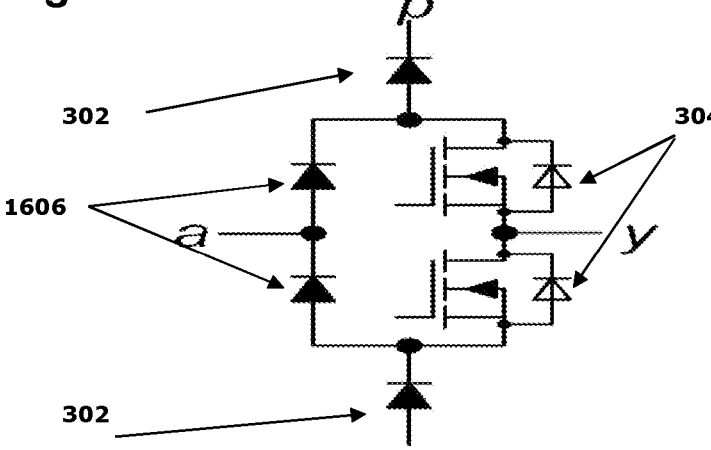

Referring now FIG. 16, illustrated are alternative circuit configurations suitable for use as a low frequency bridge leg of the integrated active filter 110 of FIG. 3.

FIG. 16a shows the arrangement illustrated in FIG. 3, where each single low frequency bridge leg is composed of two active power switches 304 with antiparallel diodes 305 and two rectifier diodes 302, with the switches presenting an anti-series connection. The two rectifier diodes 302 are series connected in the same sense, the cathode of one diode being coupled to the anode of the other. The point of interconnection a between the two rectifier diodes 302, in use being connected to one of the phases of the power supply 202. The two active power switches 304 are connected between the point of interconnection a between the two rectifier diodes 302 and a node n that is coupled to one or more phases La, Lb, or Lc of the AC machine 108.

FIG. 16b shows a low frequency bridge leg again composed of two series-connected rectifier diodes 302, and two active power switches 304 with antiparallel diodes 305, but in this case a further diode 1602 is connected in series with each of the two active power switches 304. For each switch 304, the diode 1602 that is connected in series is in the reverse sense to the antiparallel diode 305 of that switch. That is, the cathodes of the two diodes 305 and 1602 associated with a switch 304 are coupled together. In addition, each of the two switches 304 is connected between the anode of one of the diodes 1602 and the cathode of the other diode 1602 at point a. The point of interconnection a between the two rectifier diodes 302, in use again being connected to one of the phases of the power supply 202. In this configuration the switches don't need a body diode 305, so here a cheaper IGBT can be used instead of a MOSFET.

FIG. 16c shows a low frequency bridge leg again composed of two series-connected rectifier diodes 302, but instead of the cathode of one of these diodes being coupled to the anode of the other, an active power switch 304 is connected between them. The switch 304 has an anti-parallel diode 305 which is arranged in the same sense as the two rectifier diodes 302, so that the anode of the antiparallel diode is coupled to the cathode of a first of the two rectifier diodes 302, and the cathode of the anti-parallel diode is coupled to the anode of the other of the two rectifier diodes 302. A first pair of additional diodes 1604 are series connected between the cathode of the one of the rectifier diodes 302 and the anode of the other, in parallel with the active power switch 304. In addition, a second pair of additional diodes 1606 are also series connected between the cathode of the one of the rectifier diodes 302 and the anode of the other, in parallel with the active power switch 304. With this arrangement, one of the phases of the power supply 202 is, during charging, connected to the coupled anode and cathode of the second pair of additional diodes 1606, and one or more phases La, Lb, or Lc of the AC machine 108 is connected to the coupled anode and cathode of the first pair of additional diodes 1604.

FIG. 16d shows a circuit arrangement similar to that of FIG. 16c except that the second additional pair of diodes 1606 is eliminated, and in place of the single active power switch 304 a series connected pair of active power switches is used. The two active power switches 304 are here connected in the same sense. With this arrangement, the point of interconnection a between the two active power switches 302, is in use connected to one of the phases of the power supply 202. As with the circuit arrangement of FIG. 16c one or more phases La, Lb, or Lc of the AC machine 108 is connected to the coupled anode and cathode of the first pair of additional diodes 1604.

FIG. 16e shows a circuit arrangement very similar to that of FIG. 16d, but in this case one or more phases La, Lb, or Lc of the AC machine 108 is connected to the junction between the two active power switches 304, and, in use one of the phases of the power supply 202 is connected to the coupled anode and cathode of the second pair of additional diodes 1606.

Figure 17:
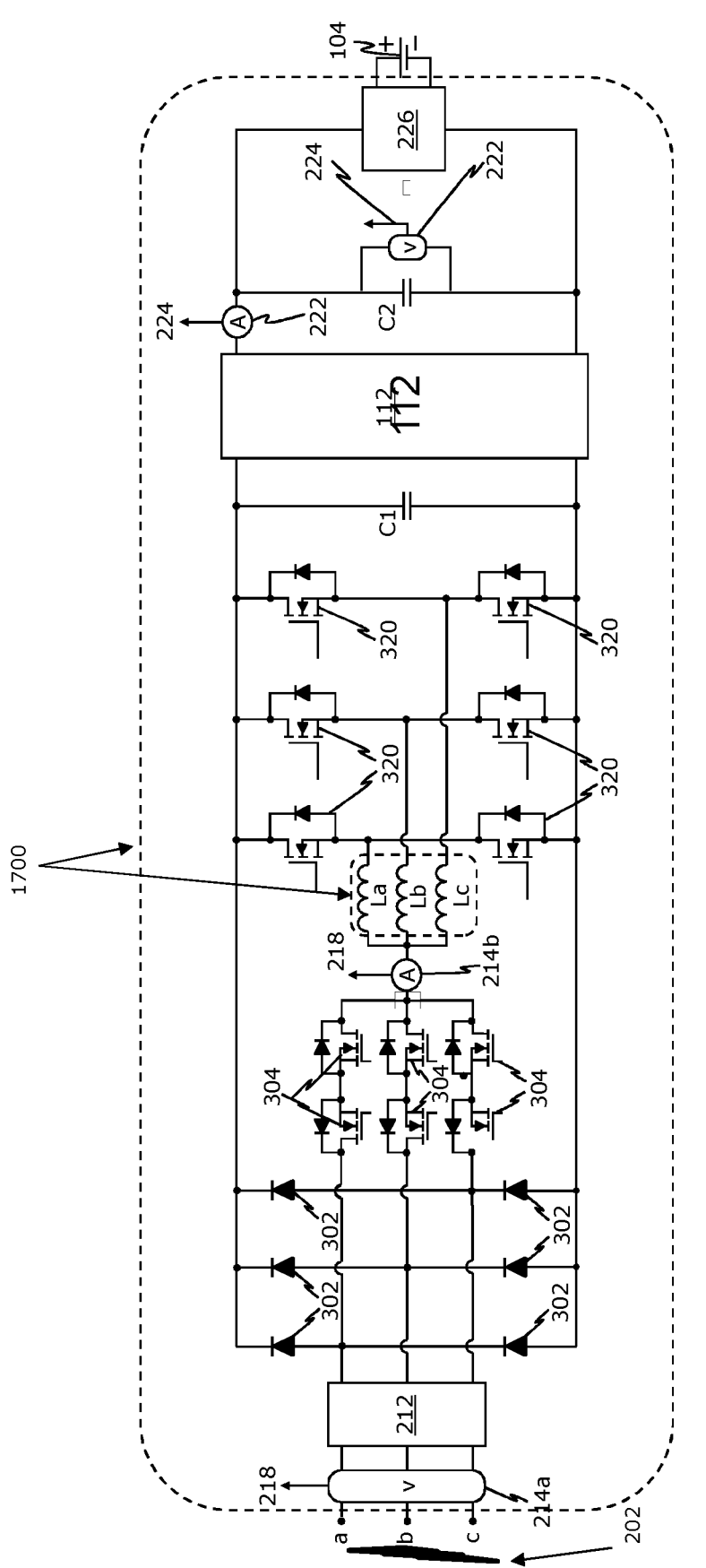
FIG. 17 is an illustration of a circuit diagram of an on-board charger module in accordance with an example of the disclosure.

It will be appreciated that although the on board charger has thus far been described as including one or more inductors of the AC machine of a battery powered electric vehicle, as is the case once the on board charger has been integrated into a vehicle, it is likely that in many instances a manufacturer of battery powered vehicles will buy-in some sub-assemblies for the assembly of the electric vehicle rather than making or buying-in all the individual components required to build a vehicle. One such sub-assembly that is likely to be bought-in is an on-board charger module suitable for realising an on-board charger according to the disclosure, and such an on-board charger module for a vehicle, and the AC machine for the vehicle, are likely to be delivered as separate items-quite possibly from different suppliers. As such, it is to be expected that examples of on-board chargers according to the disclosure will be assembled from an on-board charger module that includes the integrated active filter rectifier 110 coupled to a DC/DC converter 112, an inverter drive 106, and EMI filters 212 and 226, but which lacks the inductors of the AC machine 108. Indeed, such a module may include all the elements shown as being included in the on-board charger of FIG. 3 (or any of the other illustrated configurations), with the exception of the inductors of the AC machine 108, as illustrated in FIG. 17. The two broken line lozenges 1700 represent the outlines of one such module. Such an on board charger module is within the scope of the disclosure.

Figure 18:
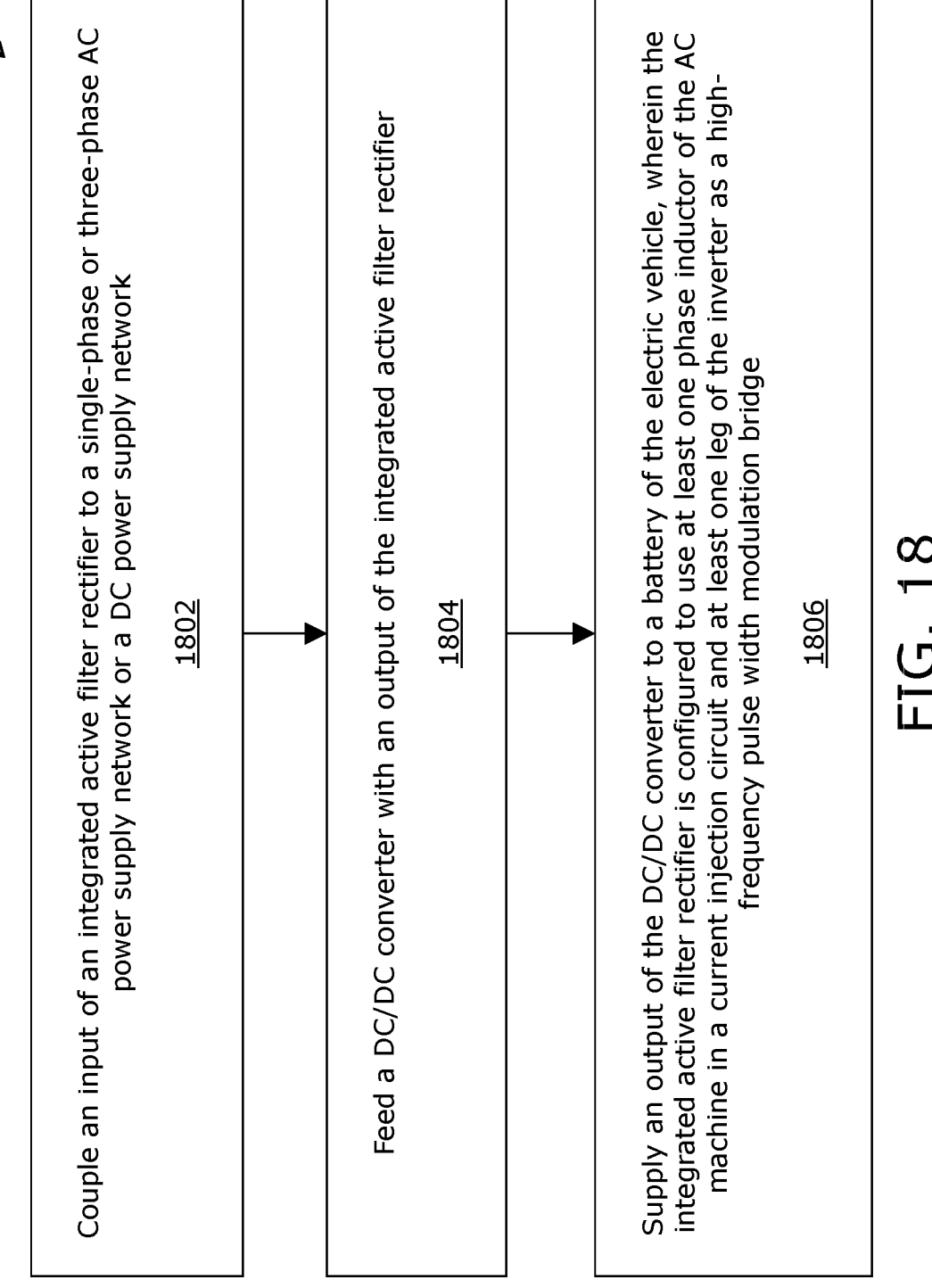
FIG. 18 is a flowchart of a method of charging a battery of an electric vehicle, in accordance with an example of the disclosure.

FIG. 18 is a flowchart of a method 1800 of charging a battery of an electric vehicle, in accordance with an embodiment of the disclosure. The method 1800 includes steps 1802 to 1806 for charging the battery of an electric vehicle that includes an AC machine, an inverter drive for the AC machine, and an on-board charger.

At step 1802, an input of an integrated active filter rectifier is coupled to a single-phase or three-phase AC power supply network or a DC power supply network. At step 1804, a DC/DC converter is fed with an output of the integrated active filter rectifier. At step 1806, an output of the DC/DC converter is supplied to the battery of the electric vehicle. In the method 1800, the integrated active filter rectifier is configured to use at least one phase inductor of the AC machine and at least one leg of the inverter drive to perform power factor correction.

The steps 1802 to 1806 are only illustrative and other alternatives can also be provided where one or more steps are added, or one or more steps are provided in a different sequence without departing from the scope of the claims herein.

FIG. 19 is a flow chart of a method 1900 of using a battery of an electric vehicle as a power source for powering external loads, in accordance with an embodiment of the disclosure. The method 1900 includes steps 1902 to 1906 for using the battery of the electric vehicle as the power source for powering external loads. The electric vehicle including an AC machine, an inverter drive for the AC machine, and an on-board charger. The on-board charger includes an integrated active filter rectifier coupled to a DC/DC converter. The integrated active filter rectifier is configured to use at least one phase inductor of the AC machine and at least one leg of the inverter drive to perform power factor correction.

At step 1902, an input of the integrated active filter rectifier is coupled to a single-phase or three-phase AC load or a DC load. At step 1804, an output of the integrated active filter rectifier is fed from an input of the DC/DC converter. At step 1906, an output of the DC/DC converter is supplied from the battery of the electric vehicle.

The steps 1902 to 1906 are only illustrative and other alternatives can also be provided where one or more steps are added, or one or more steps are provided in a different sequence without departing from the scope of the claims herein.

The disclosure provides an improved on-board charger which is a non-isolated converter that renders possible both operations of traction and charging from both single and three-phase grids.

Modifications to embodiments of the disclosure described in the foregoing are possible without departing from the scope of the disclosure as defined by the accompanying claims. Expressions such as "including", "comprising", "incorporating", "have", "is" used to describe and claim the disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable combination or as suitable in any other described embodiment of the disclosure.

What is claimed is:

1. An onboard charger for charging a battery of an electric vehicle, comprising:

a DC/DC converter;

an integrated active filter rectifier coupled to produce a DC signal to the DC/DC converter;

wherein the integrated active filter rectifier is coupled to use at least one phase inductor (La, Lb, Lc) of an AC machine of the electric vehicle and at least one leg of an inverter drive to perform power factor correction; and wherein the integrated active filter rectifier includes a pair of active power switches for each phase (a, b, c) of a three-phase mains power supply, and each of the pairs of active power switches are coupled together at a common point, the common point being coupled to one of:

a neutral terminal of the AC machine; or one of the phases (La, Lb, Lc) of the AC machine.

2. The on-board charger of claim 1, wherein the integrated active filter rectifier includes at least one pair of diodes for each phase of a three-phase mains power supply.

3. The on-board charger of claim 2, wherein the integrated active filter rectifier includes an active power switch in parallel with each of the diodes.

4. The on-board charger of claim 3, wherein each active power switch comprises a MOSFET device, and the diodes are provided by intrinsic body diodes of the MOSFET devices.

5. The on-board charger of claim 3, wherein the DC/DC converter is a bidirectional device.

6. The on-board charger according to claim 1, further comprising a first capacitor (C1) connected across an input of the DC/DC converter, wherein the first capacitor is coupled to support commutation of switches of the inverter drive.

7. The on-board charger of claim 6, wherein the on-board charger is so configured that a second capacitor having a greater capacitance than the first capacitor is connected in parallel with the first capacitor while the AC machine is in propulsion mode.

8. The on-board charger according to claim 1, wherein the DC/DC converter is configurable to provide an internal path for current to flow from an output stage of the DC/DC converter to the AC machine in propulsion mode.

9. The on-board charger according to claim 1, wherein a switching device is provided to enable the DC/DC converter to be bypassed while the AC machine is propelling the electric vehicle but not when the on-board charger is providing charging current to the battery of the electric vehicle.

10. The on-board charger according to claim 1, wherein a second capacitor is coupled across the output of the DC/DC converter, and the DC/DC converter to supply energy from the second capacitor to the output of the first stage of the on-board charger during charging.

11. The on-board charger of on claim 1, wherein the on-board charger is coupled to support charging from a single-phase AC power supply by using the integrated active filter rectifier as a bridgeless totem-pole power factor correction rectifier.

12. The on-board charger of claim 11, wherein the on-board charger includes a control arrangement to modulate at least one leg of the bridge at high frequency to generate a sinusoidal current through a corresponding phase inductor of the AC machine.

13. The on-board charger of claim 1, wherein the on-board charger is coupled to support charging from a DC power supply by using the integrated active filter rectifier as a DC/DC converter.

14. The on-board charger of claim 13, wherein the on-board charger includes a control arrangement to modulate at least one leg of the bridge at high frequency to control a direct current through a corresponding phase inductor of the AC machine.

15. A method of charging a battery of an electric vehicle that includes an AC machine, an inverter drive for the AC machine, and an on-board charger, the method comprising:

coupling an input of an integrated active filter rectifier to a single-phase or three-phase AC power supply network or a DC power supply;

feeding a DC/DC converter with an output of the integrated active filter rectifier;

supplying an output of the DC/DC converter to a battery of the electric vehicle;

wherein the integrated active filter rectifier is configured to use at least one phase inductor of the AC machine and at least one leg of the inverter drive to perform power factor correction; and coupling a second capacitor across the output of the DC/DC converter, and the DC/DC converter to supply energy from the second capacitor to the output of the first stage of the on-board charger during charging.

16. A method of using a battery of an electric vehicle as a power source for powering external loads, the electric vehicle including an AC machine, an inverter drive for the AC machine, and an on-board charger, the on-board charger including:

an integrated active filter rectifier coupled to a DC/DC converter;

wherein the integrated active filter rectifier is configured to use at least one phase inductor (La, Lb, Lc) of the AC machine and at least one leg of the inverter drive to perform power factor correction;

the method comprising:

coupling an input of the integrated active filter rectifier to a single-phase or three-phase AC load or a DC load;

feeding an output of the integrated active filter rectifier from an input of the DC/DC converter; and supplying an output of the DC/DC converter from the battery of the electric vehicle; and coupling a second capacitor having a greater capacitance than the first capacitor in parallel with the first capacitor while the AC machine is in propulsion mode.

17. An electric vehicle, comprising:

an AC machine to propel the electric vehicle;

a battery for storing charge for use by the AC machine;

an inverter drive for converting stored charge to an AC voltage for the AC machine; and an onboard charger for charging the battery from a power source, the on-board charger further comprising:

a DC/DC converter;

an integrated active filter rectifier coupled to the DC/DC converter; and wherein the integrated active filter rectifier is configured to use at least one phase inductor (La, Lb, Lc) of the AC machine and at least one leg of the inverter drive to perform power factor correction; and wherein the integrated active filter rectifier includes a pair of active power switches for each phase (a, b, c) of a three-phase mains power supply, and each of the pairs of active power switches are coupled together at a common point, the common point being coupled to one of:

a neutral terminal of the AC machine; or one of the phases (La, Lb, Lc) of the AC machine.

18. An onboard charger for charging a battery of an electric vehicle, comprising:

a DC/DC converter;

an integrated active filter rectifier coupled to produce a DC signal to the DC/DC converter;

wherein the integrated active filter rectifier is coupled to use at least one phase inductor (La, Lb, Lc) of an AC machine of the electric vehicle and at least one leg of an inverter drive to perform power factor correction; and wherein the on-board charger is configured to selective couple a second capacitor having a greater capacitance than the first capacitor in parallel with the first capacitor while the AC machine is in propulsion mode.

\*   \*   \*   \*   \*